United States Patent
Murata

(10) Patent No.: US 12,444,796 B2
(45) Date of Patent: Oct. 14, 2025

(54) BATTERY AND MANUFACTURING METHOD OF BATTERY

(71) Applicant: PRIME PLANET ENERGY & SOLUTIONS, INC., Tokyo (JP)

(72) Inventor: Ichirou Murata, Setsu (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 785 days.

(21) Appl. No.: 17/808,235

(22) Filed: Jun. 22, 2022

(65) Prior Publication Data

US 2022/0416339 A1   Dec. 29, 2022

(30) Foreign Application Priority Data

Jun. 24, 2021   (JP) ................. 2021-104579

(51) Int. Cl.
| | |
|---|---|
| *H01M 50/186* | (2021.01) |
| *H01M 50/184* | (2021.01) |
| *H01M 50/564* | (2021.01) |
| *H01M 10/04* | (2006.01) |
| *H01M 50/103* | (2021.01) |

(Continued)

(52) U.S. Cl.
CPC ....... *H01M 50/186* (2021.01); *H01M 50/184* (2021.01); *H01M 50/564* (2021.01); *H01M 10/0413* (2013.01); *H01M 10/0422* (2013.01); *H01M 50/103* (2021.01); *H01M 50/172* (2021.01); *H01M 50/176* (2021.01);

(Continued)

(58) Field of Classification Search
CPC ......... H01M 10/0413; H01M 10/0422; H01M 50/103; H01M 50/172; H01M 50/176; H01M 50/184; H01M 50/186; H01M 50/528; H01M 50/536; H01M 50/553; H01M 50/564; Y02E 60/10

See application file for complete search history.

(56) References Cited

U.S. PATENT DOCUMENTS

| | | | |
|---|---|---|---|
| 2011/0052970 A1* | 3/2011 | Kurata | ............... H01M 50/176 |
| | | | 429/158 |
| 2014/0242440 A1 | 8/2014 | Yamada et al. | |

(Continued)

FOREIGN PATENT DOCUMENTS

| | | |
|---|---|---|
| CN | 105655623 A | 6/2016 |
| CN | 106257711 A | 12/2016 |

(Continued)

*Primary Examiner* — Lingwen R Zeng
(74) *Attorney, Agent, or Firm* — Finnegan, Henderson, Farabow, Garrett, and Dunner, LLP

(57) ABSTRACT

A battery is provided in which a reliability of the caulked part vicinity of the terminal is suitably enhanced. One suitable embodiment of the battery herein disclosed includes a negative electrode electrical collector part includes a penetration hole into which the negative electrode terminal is inserted, and the penetration hole includes a taper part including an inclination for making an inner diameter become gradually larger along the insertion direction. Here, the negative electrode terminal is caulked on the taper part in a state of being arranged in the penetration hole, an outer circumference smoothing part including a step difference is formed at the outer circumferential edge on the caulked part, and a join part exists at which the outer circumference smoothing part and the edge part of the penetration hole are joined.

18 Claims, 11 Drawing Sheets

(51) Int. Cl.
  *H01M 50/172*  (2021.01)
  *H01M 50/176*  (2021.01)
  *H01M 50/528*  (2021.01)
  *H01M 50/536*  (2021.01)
  *H01M 50/553*  (2021.01)

(52) U.S. Cl.
  CPC ........ *H01M 50/528* (2021.01); *H01M 50/536* (2021.01); *H01M 50/553* (2021.01); *Y02E 60/10* (2013.01)

(56)  References Cited

U.S. PATENT DOCUMENTS

| | | |
|---|---|---|
| 2016/0155998 A1 | 6/2016 | Wakimoto et al. |
| 2016/0372722 A1 | 12/2016 | Yoshida et al. |
| 2019/0221791 A1 | 7/2019 | Wakimoto |
| 2019/0221822 A1 | 7/2019 | Wakimoto |
| 2019/0221823 A1 | 7/2019 | Wakimoto |
| 2020/0274189 A1 | 8/2020 | Muroya et al. |

FOREIGN PATENT DOCUMENTS

| | | |
|---|---|---|
| CN | 110048065 A | 7/2019 |
| CN | 111599975 A | 8/2020 |
| JP | 2011-071104 A | 4/2011 |
| JP | 2014-165155 A | 9/2014 |
| JP | 2014-229570 A | 12/2014 |
| JP | 2017-10743 A | 1/2017 |
| JP | 2019-125491 A | 7/2019 |
| JP | 2019-125492 A | 7/2019 |
| JP | 2019-125493 A | 7/2019 |

\* cited by examiner

BATTERY AND MANUFACTURING METHOD OF BATTERY

CROSS REFERENCE TO RELATED APPLICATIONS

The present application claims the priority based on Japanese Patent Application No. 2021-104579 filed on Jun. 24, 2021, the entire contents of which are incorporated in the present specification by reference.

BACKGROUND

The present disclosure relates to a battery and a manufacturing method of the battery.

BACKGROUND ART

A battery, such as a lithium ion secondary battery, is lightweight and has a high energy density compared to a conventional battery, and thus recently it is preferably used as a vehicle-mounting power supply for an electric vehicle (BEV), a plug-in hybrid vehicle (PHEV), a hybrid vehicle (HEV), or the like, and alternatively as a power supply mounted on an electric product, or the like, such as a personal computer and a portable terminal.

This kind of battery typically includes an electrode body that is provided with a positive electrode and a negative electrode (hereinafter, they might be referred to as simply "electrode", too), and includes a battery case that accommodates the electrode body. The battery case as described above generally includes an outer package that includes an opening for accommodating the electrode body, and includes an opening-seal plate that seals the opening. Then, to the opening-seal plate as described above, a positive electrode terminal and a negative electrode terminal (hereinafter, they might be referred to as simply "terminal", too) are attached, and the terminal is electrically connected to a corresponding electrode through an electrical collector member. Here, as one example of the method for connecting the terminal and the electrical collector member, it is possible to refer a method in which the terminal is inserted into a penetration hole included by the electrical collector member and then welding is performed after the tip end of the terminal is caulked (see Japanese Patent Application Publication No. 2017-010743 and Japanese Patent Application Publication No. 2019-125491).

SUMMARY

Anyway, development for a battery whose reliability is further enhanced is recently desired. Then, as the result of intensive study of the present inventor, it has been found that there is a room for improvement on the enhancement of the reliability at the vicinity of the caulked part of the terminal.

The present disclosure has been made in view of the above described circumstances, and the main purpose is to provide a battery in which the reliability at the caulked part vicinity of the terminal is suitably enhanced. In addition, another purpose is to provide a manufacturing method of the battery as described above.

The present disclosure provide a battery, including an electrode body that includes a positive electrode and a negative electrode, a battery case that includes an outer package having an opening for accommodating the above described electrode body and includes an opening-seal plate for sealing the above described opening, a terminal that is electrically connected to the above described positive electrode or the above described negative electrode and that is inserted into a terminal taking out hole of the above described opening-seal plate, and a conductive member that is connected to the above described terminal. The above described conductive member includes a penetration hole into which the above described terminal is inserted, and the above described penetration hole includes a taper part having an inclination for making an inner diameter become gradually larger along the above described insertion direction. Here, the above described terminal is caulked at the above described taper part in a state of being arranged in the above described penetration hole, an outer circumference smoothing part having a step difference is formed at an outer circumferential edge of the above described caulked part, and a join part exists at which the above described outer circumference smoothing part and an edge part of the above described penetration hole are joined. Additionally, the wording "conductive member" in the present specification and the scope of claims semantically covers an electrical collector member (positive electrode electrical collector part, and negative electrode electrical collector part) arranged in the battery case, and an outside conductive member (positive electrode outside conductive member, and negative electrode outside conductive member) arranged outside the battery case. In other words, the above described conductive member might be the electrical collector member or the outside conductive member.

As described above, in accordance with the aspect in which the terminal is caulked on the taper part in a state of being arranged in the penetration hole and in which the outer circumference smoothing part including the step difference is formed at the outer circumferential edge of the caulked part, it is possible to reduce the gap appearing between the outer circumference smoothing part and the edge part of the penetration hole. By this, it is possible to join the outer circumference smoothing part and the edge part of the penetration hole with the high accuracy, and thus it is possible to suitably enhance the reliability of the caulked part vicinity of the terminal (details will be described later).

In one aspect of the battery herein disclosed, a shape of the above described outer circumference smoothing part in a plane view is approximately a ring shape.

In one aspect of the battery herein disclosed, the above described penetration hole includes a penetration hole first area at a position away from the above described opening-seal plate more than the above described taper part, and the above described penetration hole first area is formed to be approximately perpendicular to a surface of the above described conductive member configuring a periphery of the penetration hole. In addition, preferably, a thickness of the above described penetration hole first area in an insertion direction of the above described terminal is equal to or more than 0.2 mm.

In one aspect of the battery herein disclosed, the above described penetration hole includes a penetration hole second area at a position closer to the above described opening-seal plate than the above described taper part, and the above described penetration hole second area is formed to be approximately perpendicular to a surface of the above described conductive member configuring a periphery of the above described penetration hole.

In one aspect of the battery herein disclosed, a ratio of an outermost diameter of the above described caulked part with respect to an innermost diameter at the above described penetration hole is within a range from 1.05 to 1.15.

In one aspect of the battery herein disclosed, the above described outer circumference smoothing part includes an area in which the above described join part is not formed.

In one aspect of the battery herein disclosed, a shape of the above described outer circumference smoothing part in a plane view is approximately a ring shape, and a shape of the above described join part in a plane view is a not-ring shape.

In one aspect of the battery herein disclosed, a recessed part is formed on the above described conductive member along an outer circumferential edge of the above described penetration hole.

In addition, from another aspect, a manufacturing method for any of batteries herein disclosed is provided. The above described manufacturing method is for a battery including an electrode body that includes a positive electrode and a negative electrode, a battery case that includes an outer package having an opening for accommodating the above described electrode body and comprises an opening-seal plate for sealing the above described opening, a terminal that is electrically connected to the above described positive electrode or the above described negative electrode and that is inserted into a terminal taking out hole of the above described opening-seal plate, and a conductive member that includes a penetration hole into which the above described terminal is inserted. The above described manufacturing method for the battery is including a preparing step for preparing the above described conductive member that includes a penetration hole having a taper part which includes an inclination for making an inner diameter become gradually larger along the above described insertion direction, an inserting step for inserting the above described terminal into the penetration hole, a caulking step for caulking the above described terminal at the above described taper part of the above described penetration hole so as to form a caulked part on the above described terminal, an outer circumference smoothing part forming step for forming a step difference at an outer circumferential edge of the above described caulked part, so as to form an outer circumference smoothing part, and a joining step for joining the above described outer circumference smoothing part and an edge part of the above described penetration hole. In accordance with the manufacturing method for the battery as described above, it is possible to obtain the battery in which the reliability of the caulked part vicinity of the terminal is suitably enhanced.

In one aspect of the manufacturing method for the battery herein disclosed, the above described outer circumference smoothing part is formed at the above described outer circumference smoothing part forming step to make a shape in a plane view be approximately a ring shape.

In one suitable aspect of the manufacturing method for the battery herein disclosed, the above described penetration hole includes a penetration hole first area at a position away from the above described opening-seal plate more than the above described taper part, and the above described penetration hole first area is formed to be approximately perpendicular to a surface of the above described conductive member configuring a periphery of the above described penetration hole. By making the penetration hole include the penetration hole first area, it is possible to more suitably reduce the gap appearing between the outer circumference smoothing part and the edge part of the penetration hole. By this, it is possible to join the outer circumferential flat part and the edge part of the penetration hole with the high accuracy, and thus it is possible to obtain the battery in which the reliability of the caulked part vicinity of the terminal is more suitably enhanced (details will be described later). In addition, preferably, a thickness of the above described penetration hole first area in an insertion direction of the above described terminal is equal to or more than 0.2 mm.

In one suitable aspect of the manufacturing method for the battery herein disclosed, the above described penetration hole includes a penetration hole second area at a position closer to the above described opening-seal plate than the above described taper part, and the above described penetration hole second area is formed to be approximately perpendicular to a surface of the above described conductive member configuring a periphery of the above described penetration hole. By making the penetration hole include the penetration hole second area, the penetration hole second area can receive the expansion of the terminal in the diameter direction at the caulking time, and thus it is possible to suitably inhibit the conductive member from being deformed in the vertically direction (in other words, above described insertion direction). By this, it is possible to obtain the battery in which the reliability is more suitably enhanced (details will be described later).

In one aspect of the manufacturing method for the battery herein disclosed, the above described outer circumference smoothing part is formed at the above described outer circumference smoothing part forming step to make a ratio of an outermost diameter of the above described caulked part with respect to an innermost diameter at the above described penetration hole be within a range from 1.05 to 1.15.

In one suitable aspect of the manufacturing method for the battery herein disclosed, the above described outer circumference smoothing part with an area in which the above described join part is not formed is provided at the above described joining step. By this, for example, when the laser join is performed, it can facilitate confirming the laser track deviation, which is preferable.

In one aspect of the manufacturing method for the battery herein disclosed, the above described outer circumference smoothing part is formed at the above described outer circumference smoothing part forming step to make a shape in a plane view be approximately a ring shape, and the above described join part is formed at the above described joining step to make a shape in a plane view be a not-ring shape.

In one suitable aspect of the manufacturing method for the battery herein disclosed, a recessed part is formed on the above described conductive member along an outer circumferential edge of the above described penetration hole. By forming the recessed part as described above, it is possible to reduce the heat capacity at the join part vicinity in the joining step (in other words, it is possible to implement joining with a small heat capacity), and thus it is possible to suitably reduce the heat effect on the resin member at the periphery.

BRIEF DESCRIPTION OF THE DRAWINGS

FIG. 14A is a view in which the negative electrode terminal before caulking process is inserted into a penetration hole of the negative electrode first electrical collector part, FIG. 14B is a view in which the negative electrode terminal is caulked, FIG. 14C is a view in which an outer circumference smoothing part is formed at an outer edge part of a caulked part, and FIG. 14D is a view in which the negative electrode terminal and the negative electrode first electrical collector part are joined (welded).

DETAILED DESCRIPTION OF THE PREFERRED EMBODIMENTS

Below, while referring to figures, some suitable embodiments of the herein disclosed technique are explained. Additionally, the matters other than matters particularly mentioned in this specification, and required for practicing the present disclosure (for example, a general configuration and manufacturing process for the battery by which the present disclosure is not characterized) can be grasped as design matters of those skilled in the art based on the conventional technique in the present field. The present disclosure can be executed based on the contents disclosed in the present specification, and the technical common sense in the present field. Additionally, the wording "A to B" representing a numerical value range means a content equal to or more than A but not more than B. In addition, it contains meanings "more than A" and "less than B".

Additionally, in the present specification, the "battery" is a term widely denoting an electric storage device capable of taking out the electric energy, and is a concept containing the primary battery and the secondary battery. In addition, in the present specification, the "secondary battery" is a term widely denoting an electric storage device capable of repeatedly charging and discharging, and is a concept containing so called storage batteries (chemical batteries), such as a lithium ion secondary battery and a nickel hydrogen battery, and containing capacitors (physical batteries), such as an electric double layer capacitor.

Additionally, the wording "approximately a ring shape" in the present specification and in the scope of claims can semantically cover conditions w % here, with the length of the whole circumference being treated as 100%, the lacked portion is approximately equal to or less than 30%, preferably equal to or less than 20%, more preferably equal to or less than 10%, or further preferably 0% (in other words, ring shape). In addition, the wording "not-ring shape" can semantically cover a condition where, with the length of the whole circumference being treated as 100%, the lacked portion is beyond the range represented by the above described wording "approximately a ring shape". Then, the phrase "the penetration hole first area (penetration hole second area) is formed to be approximately perpendicular to the surface of the conductive member configuring the periphery of the penetration hole" can semantically cover a condition where the angle defined by the surface of the conductive member and the penetration hole first area (penetration hole second area) is not only 90°, but also an angle close to 90° (for example, 90°±10°). In addition, the condition where the angle described above is 900 is more preferable.

<Battery 100>

Figure 1:
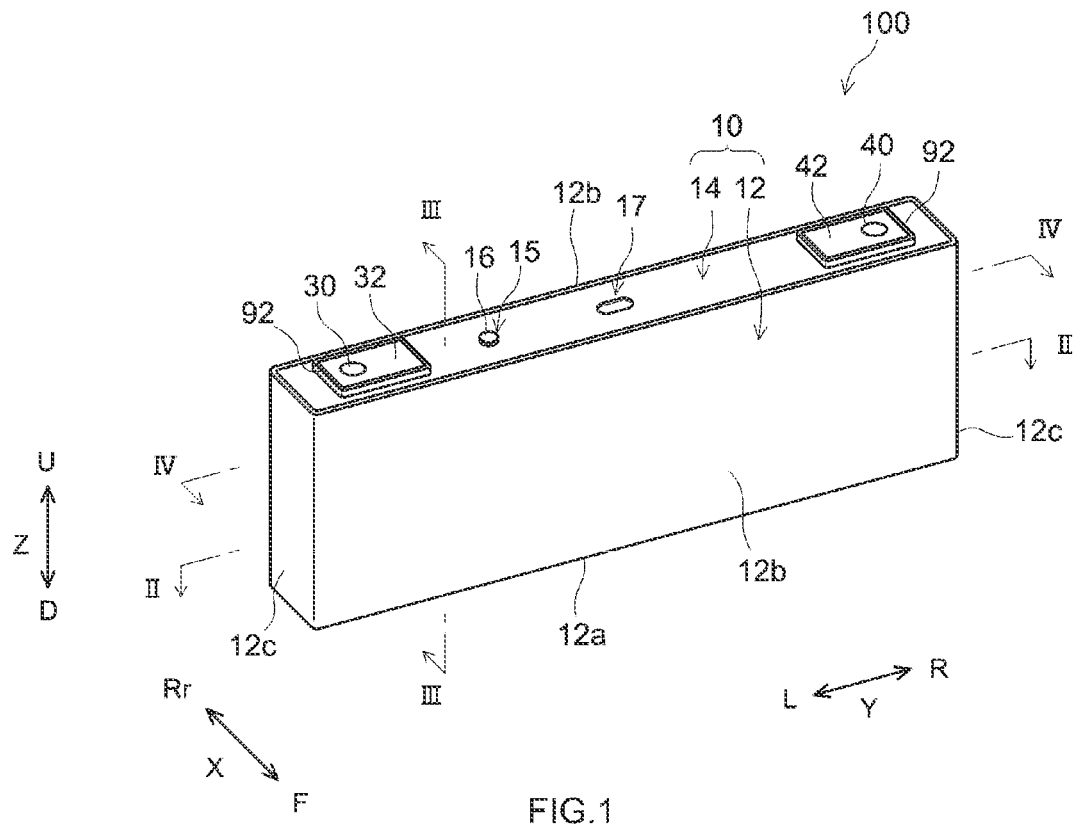
FIG. 1 is a perspective view that schematically shows a battery in accordance with one embodiment.
Figure 2:
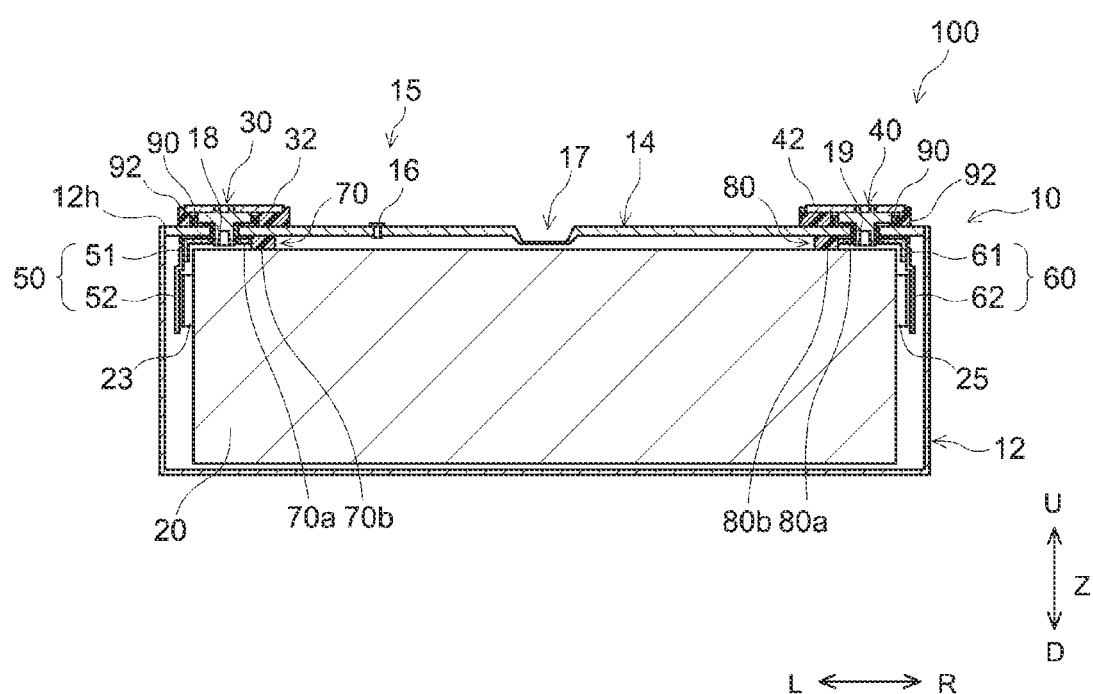
FIG. 2 is a longitudinal cross section view that is schematically shown along a II-II line of FIG. 1.
Figure 3:
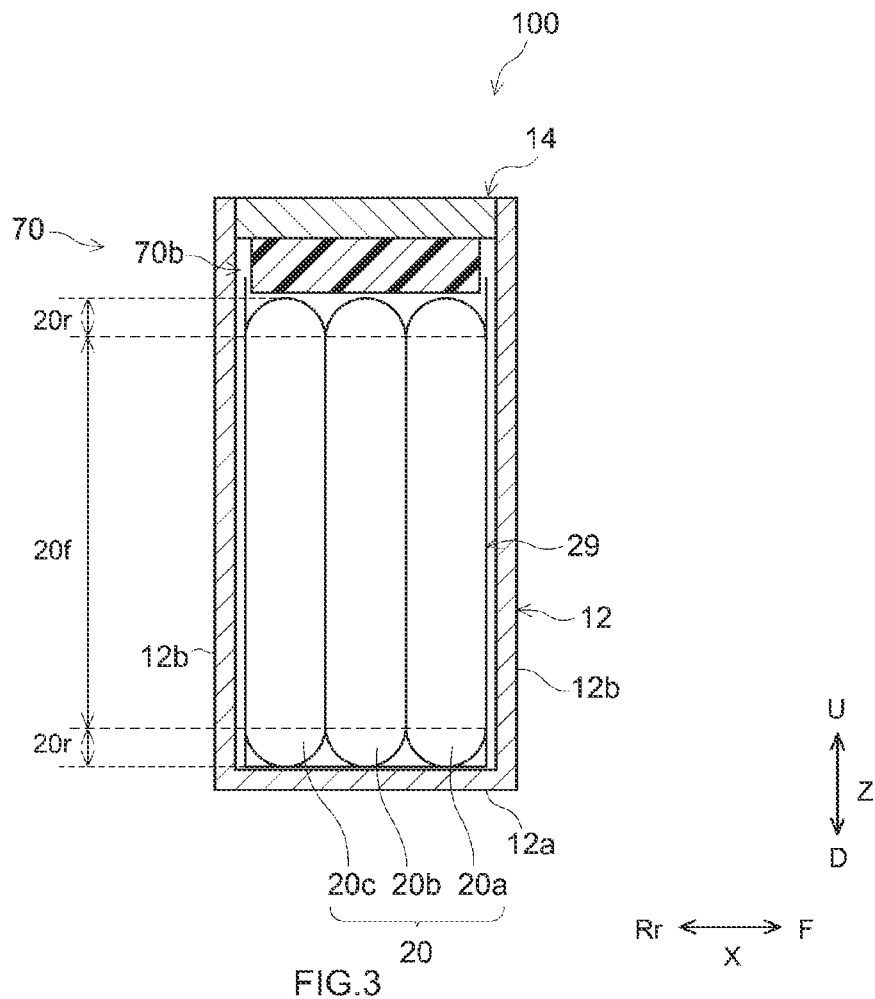
FIG. 3 is a longitudinal cross section view that is schematically shown along a III-III line of FIG. 1.
Figure 4:
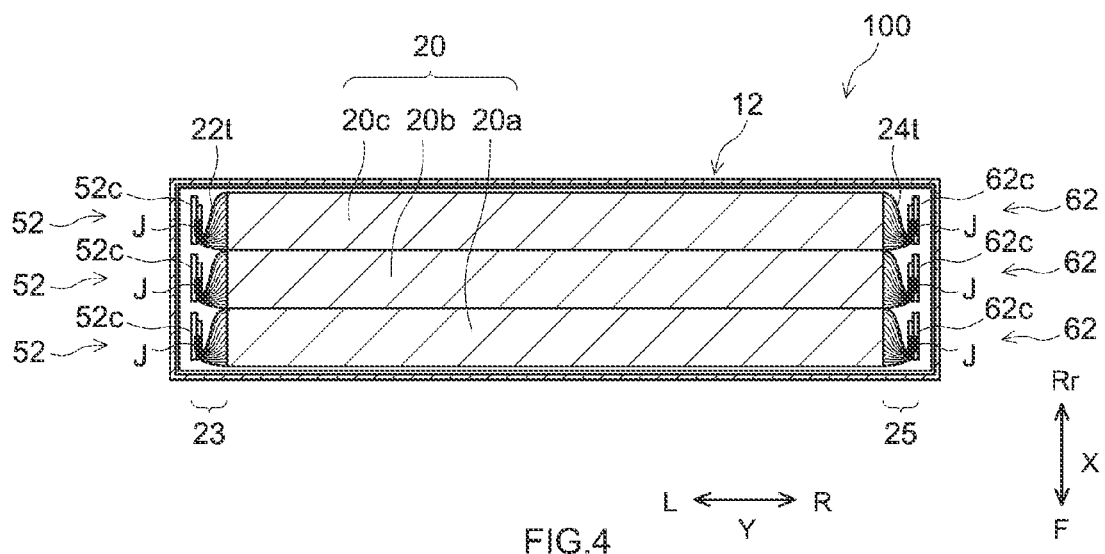
FIG. 4 is a lateral cross section view that is schematically shown along a IV-IV line of FIG. 1.

FIG. 1 is a perspective view of a battery 100. FIG. 2 is a longitudinal cross section view that is schematically shown along a II-II line of FIG. 1. FIG. 3 is a longitudinal cross section view that is schematically shown along a III-III line of FIG. 1. FIG. 4 is a lateral cross section view that is schematically shown along a IV-IV line of FIG. 1. Additionally, in the explanation described below, the reference signs L, R, F, Rr, U, and D in drawings respectively represent left, right, front, rear, up, and down, and the reference signs X, Y, and Z in drawings respectively represent the short side direction, the long side direction orthogonal to the short side direction, and the vertical direction of the battery 100. However, these explanations merely represent directions for convenience sake, and thus do not induce any restrictions on the disposed form of the battery 100.

As shown in FIG. 2, the battery 100 includes a battery case 10, an electrode body group 20, a positive electrode terminal 30, a negative electrode terminal 40, a positive electrode electrical collector part 50, a negative electrode electrical collector part 60, a positive electrode insulation member 70, and a negative electrode insulation member 80. Although not shown in drawings, the battery 100 here further includes an electrolyte. The battery 100 here is a lithium ion secondary battery. The battery 100 is characterized by the structures of the vicinities of the caulked parts 30b. 40b of the herein disclosed terminals (positive electrode terminal 30 and negative electrode terminal 40 in the present embodiment), and the other configurations might be similar to conventional configurations. The vicinity structures of the caulked parts 30b, 40b are examples of the vicinity structure of the caulked parts of the herein disclosed terminals.

The battery case 10 is a housing that accommodates the electrode body group 20. The battery case 10 here has an outer shape that is a flat and bottomed rectangular parallelopiped shape (square shape). It is enough that the material of the battery case 10 is the same as the conventionally used material, which is not restricted particularly. It is preferable that the battery case 10 is made of metal, and it is more preferable that, for example, the battery case 10 is made of aluminum, aluminum alloy, iron, iron alloy, or the like. As shown in FIG. 2, the battery case 10 includes an outer package 12 that has an opening 12h, and includes an opening-seal plate (lid body) 14 that covers the opening 12h.

As shown in FIG. 1, the outer package 12 includes a bottom wall 12a, includes a pair of long side walls 12b that extend from the bottom wall 12a and are opposed to each other, and includes a pair of short side walls 12c that extend from the bottom wall 12a and are opposed to each other. The bottom wall 12a is formed approximately in a rectangular shape. The bottom wall 12a is opposed to the opening 12h. The area of the short side wall 12c is smaller than the area of the long side wall 12b. The opening-seal plate 14 is attached to the outer package 12 to cover the opening 12h of the outer package 12. The opening-seal plate 14 is opposed to the bottom wall 12a of the outer package 12. The opening-seal plate 14 is formed to be approximately a rectangular shape in a plane view. The battery case 10 is integrated by joining (for example, welding and joining) the opening-seal plate 14 to the circumferential edge of the opening 12h of the outer package 12. The battery case 10 is airtightly sealed (closed).

As shown in FIG. 2, the opening-seal plate 14 is provided with a liquid injection hole 15, a gas exhaust valve 17, and two of terminal taking out holes 18, 19. The liquid injection hole 15 is for injecting the electrolyte after the opening-seal plate 14 is assembled to the outer package 12. The liquid injection hole 15 is sealed by a sealing member 16. The gas exhaust valve 17 is configured to be broken when the pressure inside the battery case 10 becomes equal to or more than a predetermined value, so as to exhaust the gas inside the battery case 10 to the outside. The terminal taking out holes 18, 19 are respectively formed at both end parts of the opening-seal plate 14 in the long side direction Y. The terminal taking out holes 18, 19 penetrate the opening-seal plate 14 in a vertical direction Z. The terminal taking out holes 18, 19 respectively have an inner diameter capable of inserting the positive electrode terminal 30 before attached to the opening-seal plate 14 (before caulking process) and have an inner diameter capable of inserting the negative electrode terminal 40 before attached to the opening-seal plate 14 (before caulking process).

Each of the positive electrode terminal 30 and the negative electrode terminal 40 is fixed to the opening-seal plate 14. The positive electrode terminal 30 is arranged at one side of the opening-seal plate 14 in the long side direction Y (left side in FIG. 1 and FIG. 2). The negative electrode terminal 40 is arranged at the other side of the opening-seal plate 14 in the long side direction Y (right side in FIG. 1 and FIG. 2). As shown in FIG. 1, the positive electrode terminal 30 and the negative electrode terminal 40 are exposed to the outside surface of the opening-seal plate 14. As shown in FIG. 2, the positive electrode terminal 30 and the negative electrode terminal 40 are respectively inserted into the terminal taking out holes 18, 19 and extended from the inside to the outside of the opening-seal plate 14. The positive electrode terminal 30 and the negative electrode terminal 40 are respectively caulked by the caulking process to the circumferential edge portions surrounding the terminal taking out holes 18, 19 of the opening-seal plate 14. On the end parts (down end part of FIG. 2) of the positive electrode terminal 30 and the negative electrode terminal 40 at the outer package 12 side, caulked parts 30b and 40b are respectively formed.

As shown in FIG. 2, the positive electrode terminal 30 is electrically connected to the positive electrode 22 of the electrode body group 20 through the positive electrode electrical collector part 50 at the inside of the outer package 12. The negative electrode terminal 40 is electrically connected to the negative electrode 24 of the electrode body group 20 through the negative electrode electrical collector part 60 at the inside of the outer package 12. The positive electrode terminal 30 is insulated from the opening-seal plate 14 by the positive electrode insulation member 70 and the gasket 90. The negative electrode terminal 40 is insulated from the opening-seal plate 14 by the negative electrode insulation member 80 and the gasket 90. The positive electrode terminal 30 and the negative electrode terminal 40 are examples of the herein-disclosed terminal.

It is preferable that the positive electrode terminal 30 is made of metal, and for example, it is more preferable that the positive electrode terminal 30 is made of aluminum or aluminum alloy. It is preferable that the negative electrode terminal 40 is made of metal, and for example, it is more preferable that the negative electrode terminal 40 is made of copper or copper alloy. The negative electrode terminal 40 might be configured with two of conductive members which are joined and integrated. For example, the portion connected to the negative electrode electrical collector part 60 might be made of copper or copper alloy, and the portion exposed to the surface of the outside of the opening-seal plate 14 might be made of aluminum or aluminum alloy.

As shown in FIG. 1, a plate-shaped positive electrode outside conductive member 32 and a plate-shaped negative electrode outside conductive member 42 are attached to the surface of the outside of the opening-seal plate 14. The positive electrode outside conductive member 32 is electrically connected to the positive electrode terminal 30. The negative electrode outside conductive member 42 is electrically connected to the negative electrode terminal 40. The positive electrode outside conductive member 32 and the negative electrode outside conductive member 42 each is a member to which a bus bar is attached, when a plurality of batteries 100 are electrically connected to each other. It is preferable that the positive electrode outside conductive member 32 and the negative electrode outside conductive member 42 are made of metal, and for example, it is more preferable that they are made of aluminum or aluminum alloy. The positive electrode outside conductive member 32 and the negative electrode outside conductive member 42 are insulated from the opening-seal plate 14 by an outside insulation member 92. However, neither the positive electrode outside conductive member 32 nor the negative electrode outside conductive member 42 is essential, and thus both might be omitted in another embodiment.

Figure 5:
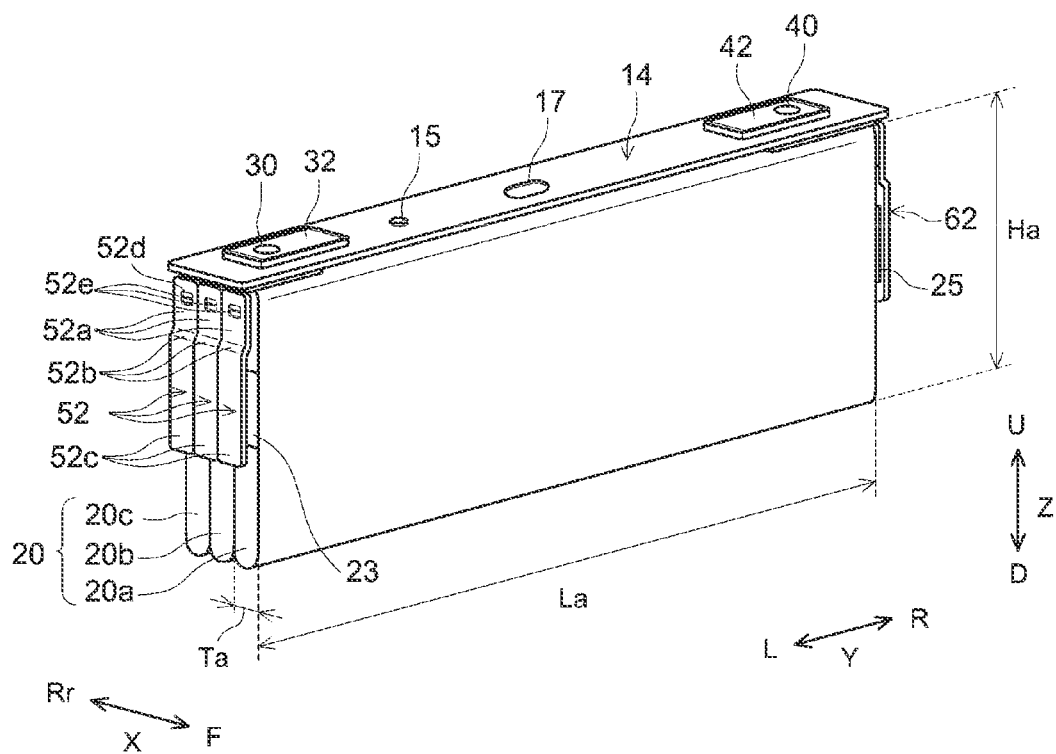
FIG. 5 is a perspective view that schematically shows an electrode body group attached to an opening-seal plate in accordance with one embodiment.

FIG. 5 is a perspective view that schematically shows the electrode body group 20 attached to the opening-seal plate 14. The electrode body group 20 here includes three of electrode bodies 20*a*, 20*b*. 20*c*. However, the number of the electrode bodies arranged inside the one outer package 12 is not restricted particularly, and the number might be equal to or more than 2 (plural), or might be 1. The electrode body group 20 here is arranged at the inside of the outer package 12 in a state of being covered by an electrode body holder 29 consisted of a resin-made sheet (see FIG. 3).

Figure 6:
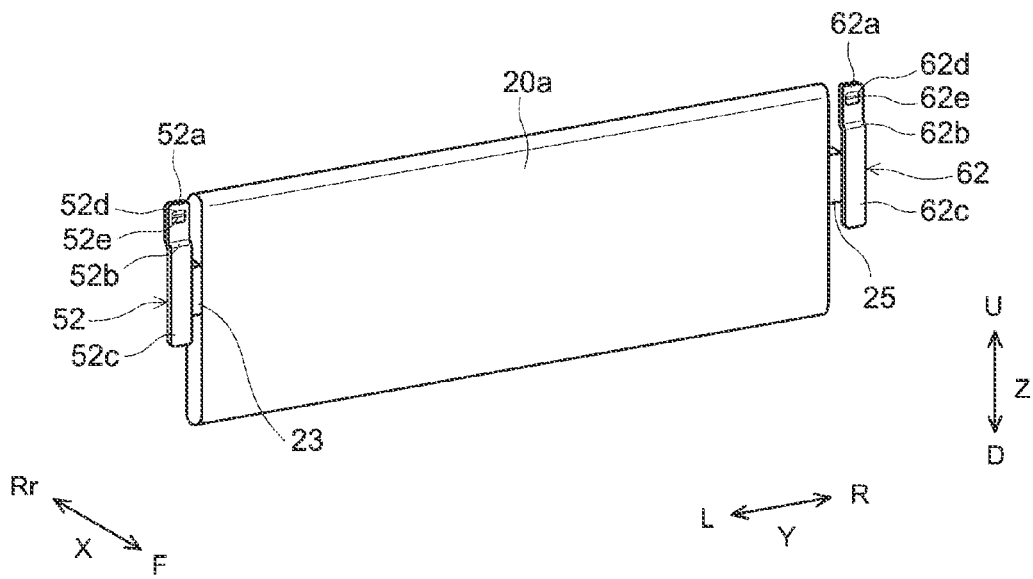
FIG. 6 is a perspective view that schematically shows an electrode body to which a positive electrode second electrical collector part and a negative electrode second electrical collector part are attached in accordance with one embodiment.
Figure 7:
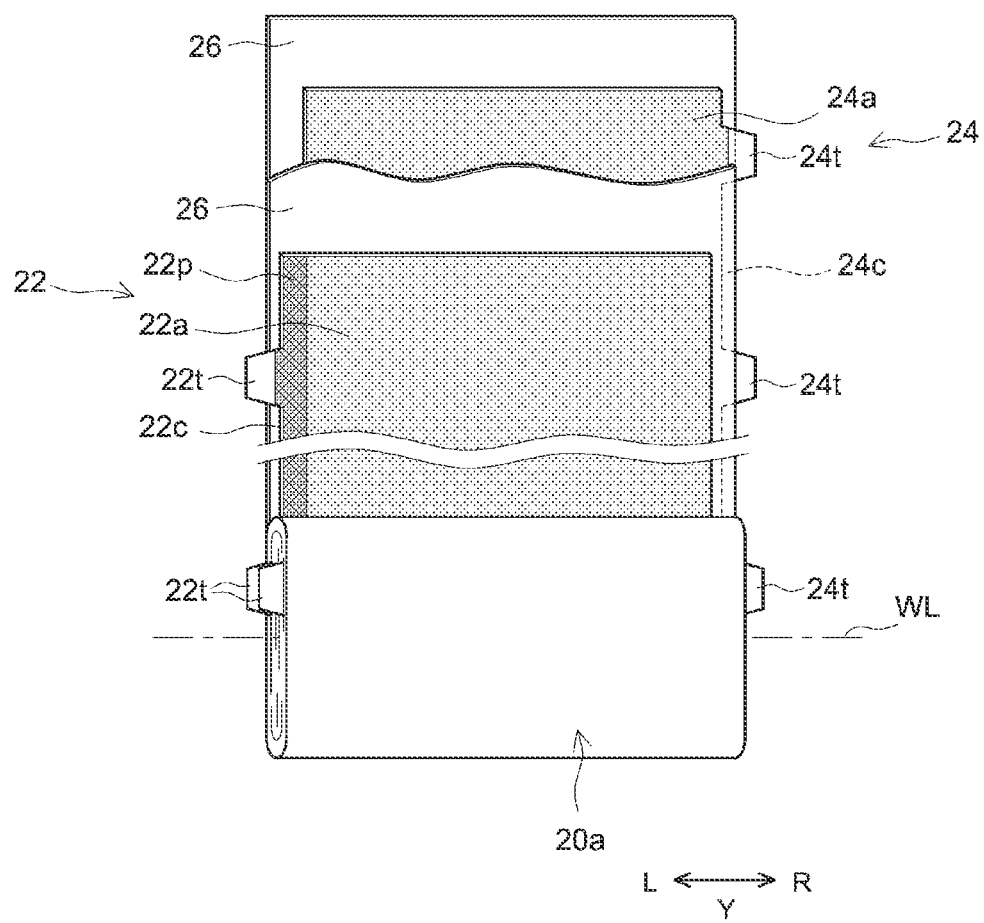
FIG. 7 is a schematic view that shows a configuration of a wound electrode body in accordance with one embodiment.

FIG. 6 is a perspective view that schematically shows the electrode body 20*a*. FIG. 7 is a schematic view that shows a configuration of the electrode body 20*a*. Additionally, while the electrode body 20*a* is explained below in detail as the example, the electrode bodies 20*b*, 20*c* can be also configured similarly. As shown in FIG. 7, the electrode body 20*a* includes a positive electrode 22 and a negative electrode 24. The electrode body 20*a* here has the strip-like shaped positive electrode 22 and the strip-like shaped negative electrode 24 be laminated through a strip-like shaped separator 26, and is a wound electrode body formed in a flat shape where the laminated resultant is wound around the wound axis WL as the center.

The electrode body 20*a* is arranged at the inside of the outer package 12 with the wound axis WL kept in a direction parallel to the long side direction Y. In other words, the electrode body 20*a* is arranged in a direction orthogonal to the short side wall 12*c* at the inside of the outer package 12 with the wound axis WL being in parallel to the bottom wall 12*a*. The end surface of the electrode body 20*a* (in other words, the lamination surface on which the positive electrode 22 and the negative electrode 24 are laminated, or end surface in the long side direction Y of FIG. 7) is opposed to the short side wall 12*c*.

As shown in FIG. 3, the electrode body 20*a* includes a pair of bent parts 20*r* that are opposed to the bottom wall 12*a* of the outer package 12 and to the opening-seal plate 14, and includes a flat part 20*f* that connects the pair of bent parts 20*r* and is opposed to the long side wall 12*b* of the outer package 12. However, the electrode body 20*a* might be a laminated electrode body in which a plurality of square shaped (typically, rectangular shaped) positive electrodes and a plurality of square shaped (typically, rectangular shaped) negative electrodes are stacked in a state that they are insulated.

As shown in FIG. 7, the positive electrode 22 includes a positive electrode electrical collector body 22*c*, and includes a positive electrode active material layer 22*a* and a positive electrode protective layer 22*p* fixed on at least one of surfaces of the positive electrode electrical collector body 22*c*. However, the positive electrode protective layer 22*p* is not essential, and it might be omitted in another embodiment. The positive electrode electrical collector body 22*c* is formed in a strip-like shape. The positive electrode electrical collector body 22*c* is made from an electric conductive metal, such as aluminum, aluminum alloy, nickel, and stainless steel. The positive electrode electrical collector body 22*c* here is a metal foil, particularly an aluminum foil.

At the one end part (left end part in FIG. 7) of the positive electrode electrical collector body 22*c* in the long side direction Y, a plurality of positive electrode tabs 22*t* are provided. The plurality of positive electrode tabs 22*t* each protrudes toward one side (left side in FIG. 7) in the long side direction Y. The plurality of positive electrode tabs 22*t* protrude in the long side direction Y more than the separator 26. The plurality of positive electrode tabs 22*t* are provided at the intervals (intermittently) along the longitudinal direction of the positive electrode 22. The plurality of positive electrode tabs 22*t* each is formed in a trapezoidal shape. The positive electrode tab 22*t* here is one part of the positive electrode electrical collector body 22*c*, and is configured with a metal foil (aluminum foil). The positive electrode tab 22*t* is a portion (electrical collector body exposed part) where neither the positive electrode active material layer 22*a* nor positive electrode protective layer 22*p* of the positive electrode electrical collector body 22*c* is formed. However, the positive electrode tab 22*t* might be a member different from the positive electrode electrical collector body 22*c*. In addition, the positive electrode tab 22*t* might be provided at the other end part in the long side direction Y (right end part of FIG. 7), or might be provided at the both end parts in the long side direction Y.

As shown in FIG. 4, the plurality of positive electrode tabs 22*t* are laminated at one end part in the long side direction Y (left end part of FIG. 4), so as to configure a positive electrode tab group 23. The plurality of positive electrode tabs 22*t* are folded to be bent with the exterior side ends being aligned. The positive electrode tab group 23 is electrically connected to the positive electrode terminal 30 through the positive electrode electrical collector part 50. It is preferable that the plurality of positive electrode tabs 22*t* are folded, and electrically connected to the positive electrode terminal 30. To the positive electrode tab group 23, a positive electrode second electrical collector part 52 described later is attached. The sizes of the plurality of positive electrode tabs 22*t* (the length in the long side direction Y and the width orthogonal to the long side direction Y, see FIG. 7) can be appropriately adjusted in consideration of the state of being connected to the positive electrode electrical collector part 50, for example, based on the formed position, or the like. The plurality of positive electrode tabs 22*t* here have different sizes from each other in order to align the exterior side ends when they are bent. The positive electrode tab group 23 is an example of the electrode tab group herein disclosed.

As shown in FIG. 7, the positive electrode active material layer 22*a* is provided in a strip-like shape along the longitudinal direction of the strip-like shaped positive electrode electrical collector body 22*c*. The positive electrode active material layer 22*a* includes a positive electrode active substance (for example, lithium transition metal composite oxide, such as lithium nickel cobalt manganese composite oxide) that can reversibly store and discharge the electric charge carrier. In the case where the whole solid content of the positive electrode active material layer 22*a* is treated as 100 mass %, the positive electrode active substance might occupy approximately 80 mass % or more, typically 90 mass % or more, or for example, 95 mass % or more. The positive electrode active material layer 22*a* might include an arbitrary component other than the positive electrode active substance, for example, electrically conductive material, binder, various additive components, or the like. As for the electrically conductive material, it is possible to use a carbon material, such as acetylene black (AB). As the binder, it is possible to use, for example, polyvinylidene fluoride (PVdF), or the like.

As shown in FIG. 7, the positive electrode protective layer 22*p* is provided at the boundary portion of the positive electrode electrical collector body 22*c* and the positive electrode active material layer 22*a* in the long side direction Y. The positive electrode protective layer 22p here is provided at one end part (left end part in FIG. 7) of the positive electrode electrical collector body 22c in the long side direction Y. However, the positive electrode protective layer 22p might be provided at the both end parts in the long side direction Y. The positive electrode protective layer 22p is provided in a strip-like shape along the positive electrode active material layer 22a. The positive electrode protective layer 22p includes an inorganic filler (for example, alumina). In the case where the whole solid content of the positive electrode protective layer 22p is treated as 100 mass %, the inorganic filler might occupy approximately 50 mass % or more, typically 70 mass % or more, or for example, 80 mass % or more. The positive electrode protective layer 22p might include an arbitrary component other than the inorganic filler, for example, electrically conductive material, binder, various additive components, or the like. The electrically conductive material and the binder might be the same as the illustrated components capable of being included in the positive electrode active material layer 22a.

As shown in FIG. 7, the negative electrode 24 includes a negative electrode electrical collector body 24c, and a negative electrode active material layer 24a fixed on at least one of surfaces of the negative electrode electrical collector body 24c. The negative electrode electrical collector body 24c is formed in a strip-like shape. The negative electrode electrical collector body 24c is made from an electric conductive metal, such as copper, copper alloy, nickel, and stainless steel. The negative electrode electrical collector body 24c here is a metal foil, particularly a copper foil.

At the one end part (right end part in FIG. 7) of the negative electrode electrical collector body 24c in the long side direction Y, a plurality of negative electrode tabs 24t are provided. The plurality of negative electrode tabs 24t protrude toward one side (right side in FIG. 7) in the long side direction Y. The plurality of negative electrode tabs 24t protrude in the long side direction Y more than the separator 26. The plurality of negative electrode tabs 24t are provided at the intervals (intermittently) along the longitudinal direction of the negative electrode 24. The plurality of negative electrode tabs 24t each is formed in a trapezoidal shape. The negative electrode tab 24t here is one part of the negative electrode electrical collector body 24c, and is configured with a metal foil (copper foil). The negative electrode tab 24t here is a portion where the negative electrode active material layer 24a of the negative electrode electrical collector body 24c is not formed (electrical collector body exposed part). However, the negative electrode tab 24t might be a member different from the negative electrode electrical collector body 24c. In addition, the negative electrode tab 24t might be provided at the other end part in the long side direction Y (left end part in FIG. 7), or might be provided at both end parts in the long side direction Y.

As shown in FIG. 4, a plurality of negative electrode tabs 24t are laminated at one end part in the long side direction Y (right end part in FIG. 6), so as to configure a negative electrode tab group 25. The plurality of negative electrode tabs 24t are folded to be bent with the exterior side ends being aligned. The negative electrode tab group 25 is electrically connected to the negative electrode terminal 40 through the negative electrode electrical collector part 60. It is preferable that the plurality of negative electrode tabs 24t are folded, and electrically connected to the negative electrode terminal 40. To the negative electrode tab group 25, a negative electrode second electrical collector part 62 described later is attached. The sizes of the plurality of negative electrode tabs 24t (the length in the long side direction Y and the width orthogonal to the long side direction Y, see FIG. 7) can be appropriately adjusted in consideration of the state of being connected to the negative electrode electrical collector part 60, for example, based on the formed position, or the like. The plurality of negative electrode tabs 24t here have different sizes from each other in order to align the exterior side ends when they are bent. The negative electrode tab group 25 is an example of the electrode tab group herein disclosed.

The negative electrode active material layer 24a is provided in a strip-like shape along the longitudinal direction of the strip-like shaped negative electrode electrical collector body 24c. The negative electrode active material layer 24a includes a negative electrode active substance (for example, carbon material, such as graphite) that can reversibly store and discharge the electric charge carrier. In the case where the whole solid content of the negative electrode active material layer 24a is treated as 100 mass %, the negative electrode active substance might occupy approximately 80 mass % or more, typically 90 mass % or more, or for example, 95 mass % or more. The negative electrode active material layer 24a might include an arbitrary component other than the negative electrode active substance, for example, binder, dispersing agent, various additive components, or the like. As the binder, it is possible to use rubbers, for example, styrene butadiene rubber (SBR), or the like. As the dispersing agent, it is possible to use celluloses, for example, carboxy methyl cellulose (CMC), or the like.

The separator 26 is a member that insulates the positive electrode active material layer 22a of the positive electrode 22 and the negative electrode active material layer 24a of the negative electrode 24. As for the separator 26, a porous resin sheet is suitable that is made from polyolefin resin, such as polyethylene (PE), and polypropylene (PP). Additionally, on the surface of the separator 26, a heat resistance layer (HRL) including an inorganic filler might be provided. As the inorganic filler, it is possible to use, for example, alumina, boehmite, aluminum hydroxide, titania, or the like.

It is enough that the electrolyte is similar to the conventional one, and the electrolyte is not particularly restricted. The electrolyte is, for example, a nonaqueous electrolyte containing a nonaqueous type solvent and a supporting salt. The nonaqueous type solvent includes carbonates, for example, ethylene carbonate, dimethyl carbonate, ethyl methyl carbonate, or the like. The supporting salt is, for example, a fluorine-containing lithium salt, such as $LiPF_6$. However, the electrolyte might be in a solid form (solid electrolyte) and be integrated with the electrode body group 20.

The positive electrode electrical collector part 50 configures a conduction passage that electrically connects the positive electrode tab group 23 consisted of the plurality of positive electrode tabs 22t and the positive electrode terminal 30. As shown in FIG. 2, the positive electrode electrical collector part 50 includes a positive electrode first electrical collector part 51 and a positive electrode second electrical collector part 52. The positive electrode first electrical collector part 51 and the positive electrode second electrical collector part 52 might be made from the same metal species as the positive electrode electrical collector body 22c, for example, an electric conductive metal of aluminum, aluminum alloy, nickel, stainless steel, or the like.

Figure 10:
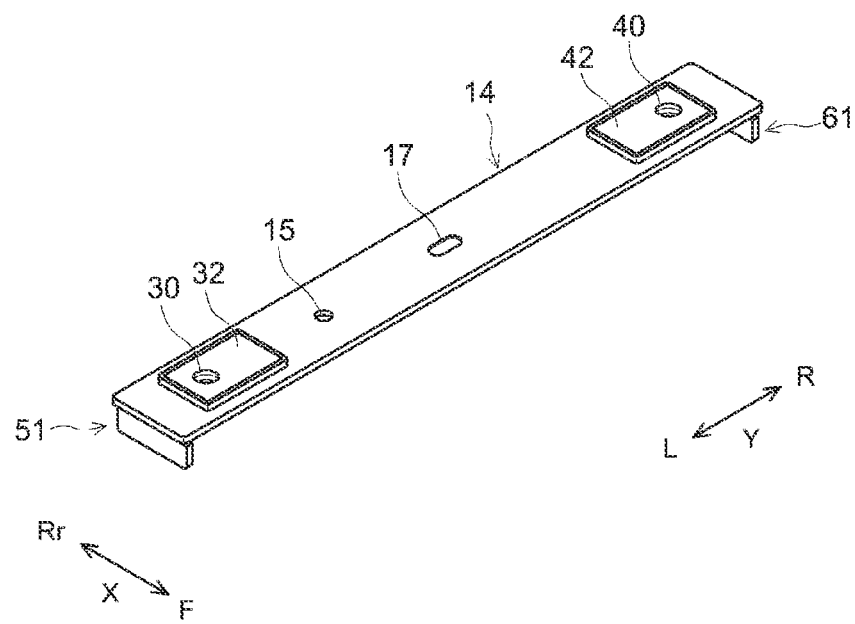
FIG. 10 is a perspective view that schematically shows an opening-seal plate to which a positive electrode terminal, the negative electrode terminal, a positive electrode first electrical collector part, a negative electrode first electrical collector part, a positive electrode insulation member, and a negative electrode insulation member are attached.
Figure 11:
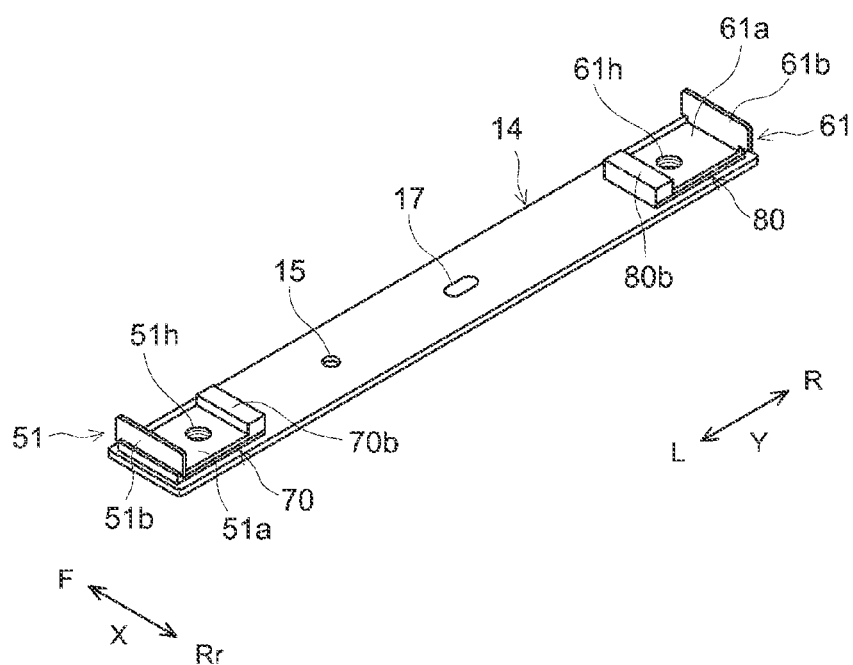
FIG. 11 is a perspective view in which the opening-seal plate of FIG. 10 is reversed.

FIG. 10 is a perspective view that schematically shows the opening-seal plate 14. FIG. 11 is a perspective view in which the opening-seal plate of FIG. 10 is reversed. FIG. 11 shows a surface at the side of outer package 12 (inner side) of the opening-seal plate 14. As shown in FIG. 10 and FIG. 11, the positive electrode first electrical collector part 51 is attached to the inner side surface of the opening-seal plate 14. The positive electrode first electrical collector part 51 is an example of the electrical collector part herein disclosed. The positive electrode first electrical collector part 51 includes a positive electrode first area 51a and a positive electrode second area 51b. The positive electrode first electrical collector part 51 might be configured, for example, by bending one member with a pressing process, or the like, or might be configured by integrating a plurality of members with welding and joining, or the like. The positive electrode first electrical collector part 51 here is fixed to the opening-seal plate 14 by a caulking process.

The positive electrode first area 51a is a portion arranged between the opening-seal plate 14 and the electrode body group 20. The positive electrode first area 51a extends along the long side direction Y. The positive electrode first area 51a expands horizontally along the inner side surface of the opening-seal plate 14. Between the opening-seal plate 14 and the positive electrode first area 51a, the positive electrode insulation member 70 is arranged. The positive electrode first area 51a is insulated from the opening-seal plate 14 by the positive electrode insulation member 70. The positive electrode first area 51a here is electrically connected to the positive electrode terminal 30 by the caulking process (details are described later). In the positive electrode first area 51a, at the position corresponding to the terminal taking out hole 18 of the opening-seal plate 14, a penetration hole 51h being penetrated in the vertical direction Z is formed. The positive electrode second area 51b is a portion arranged between the short side wall 12c of the outer package 12 and the electrode body group 20. The positive electrode second area 51b extends from the one side end (left end in FIG. 2) of the positive electrode first area 51a in the long side direction Y to the short side wall 12c of the outer package 12. The positive electrode second area 51b extends along the vertical direction Z.

The positive electrode second electrical collector part 52 extends along the short side wall 12c of the outer package 12. As shown in FIG. 6, the positive electrode second electrical collector part 52 includes an electrical collector plate connecting part 52a, an inclined part 52b, and a tab join part 52c. The electrical collector plate connecting part 52a is a portion electrically connected to the positive electrode first electrical collector part 51. The electrical collector plate connecting part 52a extends along the vertical direction Z. The electrical collector plate connecting part 52a is arranged so as to be approximately perpendicular to the wound axis WL of the electrode body 20a, 20b, 20c. On the electrical collector plate connecting part 52a, a recessed part 52d is provided whose thickness is thinner than the periphery. On the recessed part 52d, a penetration hole 52e is provided that is penetrated in the short side direction X. The penetration hole 52e is to be a reference position for welding, and around it, a join part with the positive electrode first electrical collector part 51 is formed. The join part is a welded and joined part that is formed, for example, by welding, such as ultrasonic welding, resistance welding, and laser welding. On the positive electrode second electrical collector part 52, a fuse might be provided.

The tab join part 52c is a portion which is attached to the positive electrode tab group 23, and electrically connected to the plurality of positive electrode tabs 22t. As shown in FIG. 5, the tab join part 52c extends along the vertical direction Z. The tab join part 52c is arranged so as to be approximately perpendicular to the wound axis WL of the electrode body 20a. 20b, 20c. The surface of the tab join part 52c connected to the plurality of positive electrode tabs 22t is arranged in an approximately parallel direction to the short side wall 12c of the outer package 12. As shown in FIG. 4, on the tab join part 52c, a join part J is formed that is joined to the positive electrode tab group 23. The join part J is a welded and joined part that is formed, for example, by welding, such as ultrasonic welding, resistance welding, and laser welding, in a state that the plurality of positive electrode tabs 22t are overlaid. The welded and joined part is arranged with the plurality of positive electrode tabs 22t being gathered to one side in the short side direction X of the electrode body 20a, 20b, 20c. This can implement suitably bending the plurality of positive electrode tabs 22t so as to stably form the bent-shaped positive electrode tab group 23 as shown in FIG. 4.

The inclined part 52b is a portion that connects the down end of the electrical collector plate connecting part 52a to the top end of the tab join part 52c. The inclined part 52b is inclined with respect to the electrical collector plate connecting part 52a and the tab join part 52c. The inclined part 52b connects the electrical collector plate connecting part 52a to the tab join part 52c so as to position the electrical collector plate connecting part 52a closer to the center side more than the tab join part 52c in the long side direction Y. Thus, it is possible to expand the accommodation space of the electrode body group 20 so as to implement the high energy densification of the battery 100. It is preferable that the down end of the inclined part 52b (in other words, end part at the bottom wall 12a side of the outer package 12) positions downward more than the down end of the positive electrode tab group 23. This can implement more suitably bending the plurality of positive electrode tabs 22t so as to stably form the bent-shaped positive electrode tab group 23 as shown in FIG. 4.

The negative electrode electrical collector part 60 configures a conduction passage that electrically connects the negative electrode tab group 25 and the negative electrode terminal 40, the negative electrode tab group 25 being consisted of the plurality of negative electrode tabs 24t. As shown in FIG. 2, the negative electrode electrical collector part 60 includes a negative electrode first electrical collector part 61 and a negative electrode second electrical collector part 62. The negative electrode first electrical collector part 61 is an example of the electrical collector part herein disclosed. The negative electrode first electrical collector part 61 and the negative electrode second electrical collector part 62 might be made from the same metal spices as the negative electrode electrical collector body 24c, for example, an electric conductive metal of copper, copper alloy, nickel, stainless steel, or the like. The configurations of the negative electrode first electrical collector part 61 and negative electrode second electrical collector part 62 might be similar to those of the positive electrode first electrical collector part 51 and positive electrode second electrical collector part 52 of the positive electrode electrical collector part 50.

As shown in FIG. 11, the negative electrode first electrical collector part 61 includes a negative electrode first area 61a and a negative electrode second area 61b. Between the opening-seal plate 14 and the negative electrode first area 61a, a negative electrode insulation member 80 is arranged. The negative electrode first area 61a is insulated from the opening-seal plate 14 by the negative electrode insulation member 80. The negative electrode first area 61a here is electrically connected to the negative electrode terminal 40 by a caulking process (details are described later). In the positive electrode first area 51a, at the position corresponding to the terminal taking out hole 19 of the opening-seal plate 14, a penetration hole 61h is formed that is penetrated in the vertical direction Z. As shown in FIG. 6, the negative electrode second electrical collector part 62 includes an electrical collector plate connecting part 62a that is electrically connected to the negative electrode first electrical collector part 61, an inclined part 62b, and a tab join part 62c that is attached to the negative electrode tab group 25 and electrically connected to the plurality of negative electrode tabs 24t. The electrical collector plate connecting part 62a includes a recessed part 62d that is connected to the tab join part 62c. The recessed part 62d is provided with a penetration hole 62e that is penetrated in the short side direction X.

As shown in FIG. 11, the positive electrode insulation member 70 is a member that establishes an insulation of the opening-seal plate 14 and the positive electrode first electrical collector part 51. The positive electrode insulation member 70 is made of a resin material that has the resistance and electric insulating property to the used electrolyte and that is elastically deformable, and it is preferable that the positive electrode insulation member is, for example, made from a polyolefin resin, such as polypropylene (PP), a fluorinated resin, such as tetrafluoroethylene-perfluoroalkoxyethylene copolymer (PFA), a polyphenylene sulfide (PPS), or the like.

As shown in FIG. 11, the positive electrode insulation member 70 includes a base part 70a and a protruding part 70b. As shown in FIG. 11, in the long side direction Y, the protruding part 70b is provided at the center side (right side in FIG. 10) of the opening-seal plate 14 more than the base part 70a. The base part 70a and the protruding part 70b are here integrally formed. The positive electrode insulation member 70 is an integrally-formed product that is integrally formed with a resin material as described above. Thus, it is possible to reduce the number of used members so as to implement the cost reduction, compared with a case where the base part 70a is made to be a member different from the protruding part 70b. In addition, it is possible to more easily prepare the positive electrode insulation member 70. Additionally, the negative electrode insulation member 80 can be also configured similarly. The negative electrode insulation member 80 here, similarly to the positive electrode insulation member 70, includes a base part 80a arranged between the opening-seal plate 14 and the negative electrode first electrical collector part 61, and a protruding part 80b.

As described above, the positive electrode first area 51a and the negative electrode first area 61a are respectively and electrically connected to the positive electrode terminal 30 and the negative electrode terminal 40 by the caulking step and the following joining (welding) step. Then, the battery 100 in accordance with the present embodiment is characterized by the vicinity structures of the caulked parts 30b, 40b of the positive electrode terminal 30 and negative electrode terminal 40. Below, while the vicinity structure of the caulked part 40b of the negative electrode terminal 40 is explained as the example, the vicinity structure of the caulked part 30b of the positive electrode terminal 30 can be also explained similarly. In other words, regarding the following descriptions, the wording "negative electrode" can be appropriately read as "positive electrode".

Figure 8:
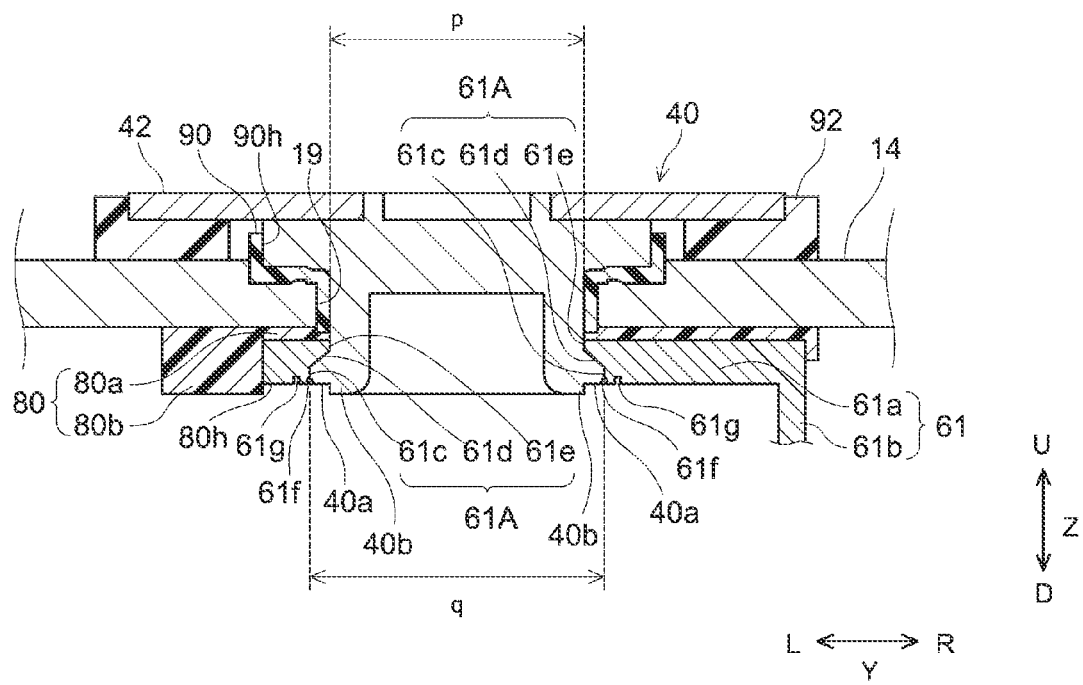
FIG. 8 is a partially enlarged cross sectional view that schematically shows a vicinity of a negative electrode terminal of FIG. 2.

FIG. 8 is a partially enlarged cross sectional view that schematically shows the vicinity of the negative electrode terminal 40 of FIG. 2. As shown in FIG. 8, the negative electrode electrical collector part 60 in accordance with the present embodiment (for more details, a negative electrode first area 61a) includes a penetration hole 61A into which a negative electrode terminal (for more details, a negative electrode terminal 40' before the caulking process) is inserted. The penetration hole 61A includes a taper part 61d having an inclination for making the inner diameter become gradually larger along the above described insertion direction (in other words, the down direction D in FIG. 8). In addition, the penetration hole 61A in accordance with the present embodiment further includes a penetration hole first area 61c and a penetration hole second area 61e. The penetration hole first area 61c and the penetration hole second area 61e are formed to be approximately perpendicular (here, perpendicular) to the surface of the negative electrode first area 61a configuring the periphery of the penetration hole 61A. In addition, the negative electrode terminal 40 is caulked at the taper part 61d in a state of being arranged in the penetration hole 61A, and an outer circumference smoothing part 40a that includes a step difference is formed at the outer circumferential edge of the caulked part 40b. Then, on the outer circumference smoothing part 40a, a join part 61f in which the outer circumference smoothing part 40a and the edge part of the penetration hole 61A are joined is formed, and at the outer circumferential edge of the penetration hole 61A, a recessed part 61g exists that is formed along the outer circumferential edge.

In addition, the shape in a plane view of the outer circumference smoothing part 40a in accordance with the present embodiment is approximately a ring shape (here, it is a ring shape). Here, as shown in FIG. 8, although the ratio (q/p) of the outermost diameter q of the caulked part 40b to the innermost diameter p at the penetration hole 61A is not particularly restricted if the effects of the technique herein disclosed is implemented, it can be approximately equal to or more than 1.02 or preferably equal to or more than 1.05. In addition, although the upper limit of the above described ratio (q/p) is not particularly restricted if the effects of the technique herein disclosed is implemented, it can be approximately equal to or less than 1.5, preferably equal to or less than 1.2, or more preferably equal to or less than 1.15. In other words, the above described ratio (q/p) can be preferably within a range from 1.05 to 1.15.

Figure 9A:
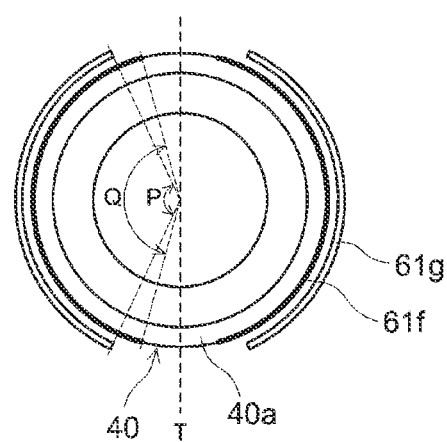
FIG. 9A is a partial plane view that schematically shows the vicinity of the negative electrode terminal of FIG. 2.
Figure 9B:
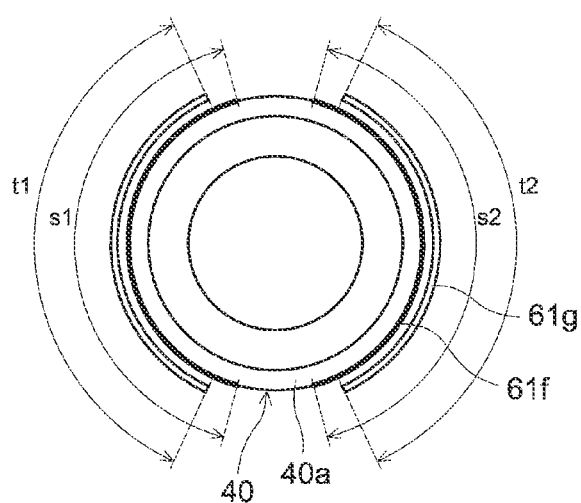
FIG. 9B is a partial plane view that schematically shows the vicinity of the negative electrode terminal of FIG. 2.

FIG. 9A and FIG. 9B are partial plane views that schematically show the vicinity of the negative electrode terminal 40 of FIG. 2. As shown in FIG. 9B, the shape in a plane view of the join part 61f in accordance with the present embodiment is a not-ring shape. In other words, there is an area on the outer circumference smoothing part 40a where the join part 61f is not formed. Here, although the ratio (s/r) of a length s of the join part 61f in the circumferential direction (corresponding to the sum of lengths s1 and s2 of FIG. 9B) to a length r (not shown) of the outermost circumference of the outer circumference smoothing part 40a is not particularly restricted if the effects of the technique herein disclosed is implemented, it can be approximately equal to or more than 0.4, preferably equal to or more than 0.5, or more preferably equal to or more than 0.6. In addition, although the upper limit of the above described ratio (s/r) is not particularly restricted if the effects of the technique herein disclosed is implemented, it can be preferably equal to or less than 0.9, or more preferably equal to or less than 0.8.

As shown in FIG. 9B, the shape in a plane view of the recessed part 61g in accordance with the present embodiment is a not-ring shape. Here, although the ratio (t/s) of a length t of the recessed part 61g in the circumferential direction (corresponding to the sum of lengths t1 and t2 of FIG. 9B) to the length s of the join part 61f in the circumferential direction is not particularly restricted if the effects of the technique herein disclosed is implemented, it can be approximately equal to or more than 0.5, preferably equal to or more than 0.7, or more preferably equal to or more than 0.8. In addition, although the upper limit of the above described ratio (t/s) is not particularly restricted if the effects of the technique herein disclosed is implemented, it can be approximately equal to or less than 1.5, preferably equal to or less than 1.3 (for example, equal to or less than 1.2), or more preferably equal to or less than 1. In other words, the above described ratio (t/s) can be preferably within a range from 0.7 to 1.3 or from 0.8 to 1.2. Furthermore, as shown in FIG. 9A, the central angle P included by the recessed part 61g in accordance with the present embodiment is smaller than the central angle Q included by the join part 61f.

<Manufacturing Method of Battery 100>

Figure 12:
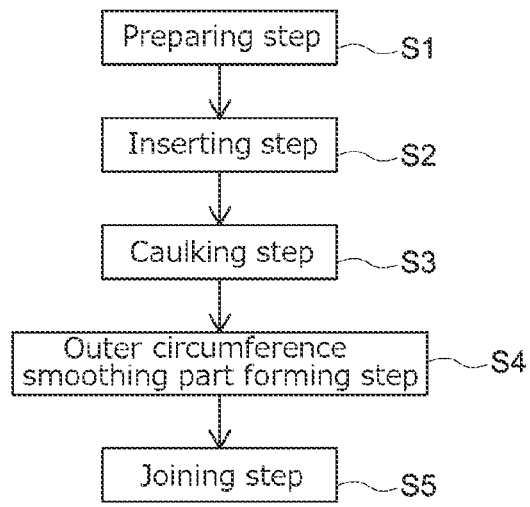
FIG. 12 is a flowchart for explaining a manufacturing method of the battery in accordance with one embodiment.

The manufacturing method of the battery 100 is characterized by forming the vicinity structures of the caulked parts 30b, 40b of the positive electrode terminal 30 and negative electrode terminal 40 as described above. The other manufacturing processes might be similar to the conventional processes. The battery 100 can be manufactured by preparing the above described battery case 10 (outer package 12 and opening-seal plate 14), the electrode body group 20 (electrode bodies 20a, 20b, 20c), the electrolyte, the positive electrode terminal 30, the negative electrode terminal 40, the positive electrode electrical collector part 50 (positive electrode first electrical collector part 51 and positive electrode second electrical collector part 52), the negative electrode electrical collector part 60 (negative electrode first electrical collector part 61 and negative electrode second electrical collector part 62), the positive electrode insulation member 70, and the negative electrode insulation member 80, and then by performing a manufacturing method including, for example, a first attaching step, a second attaching step, an inserting step, and a sealing step. In addition, the manufacturing method of the battery 100 in accordance with the present embodiment is characterized by including steps S1 to S5 as shown in the flowchart of FIG. 12 at the above described first attaching step. In addition, the manufacturing method herein disclosed might further include another step at an arbitrary stage.

At the first attaching step, a first combined member as shown in FIG. 10 and FIG. 11 is manufactured. In particular, at first, the opening-seal plate 14 is attached with the seal member 90, the positive electrode terminal 30, the positive electrode first electrical collector part 51, the positive electrode insulation member 70, the negative electrode terminal 40, the negative electrode first electrical collector part 61, and the negative electrode insulation member 80. Below, it describes in details about attaching the negative electrode terminal 40, the negative electrode first electrical collector part 61, and the negative electrode insulation member 80 to the opening-seal plate 14. Additionally, regarding the manufacturing method of the battery 100 in accordance with the present embodiment, it is also possible to similarly attach the positive electrode terminal 30, the positive electrode first electrical collector part 51, and the positive electrode insulation member 70 to the opening-seal plate 14, in other words, regarding the following descriptions, the wording "negative electrode" can be appropriately read as "positive electrode". Below, it explains while appropriately referring to FIG. 8 and FIG. 12 to FIG. 14.

Figure 13:
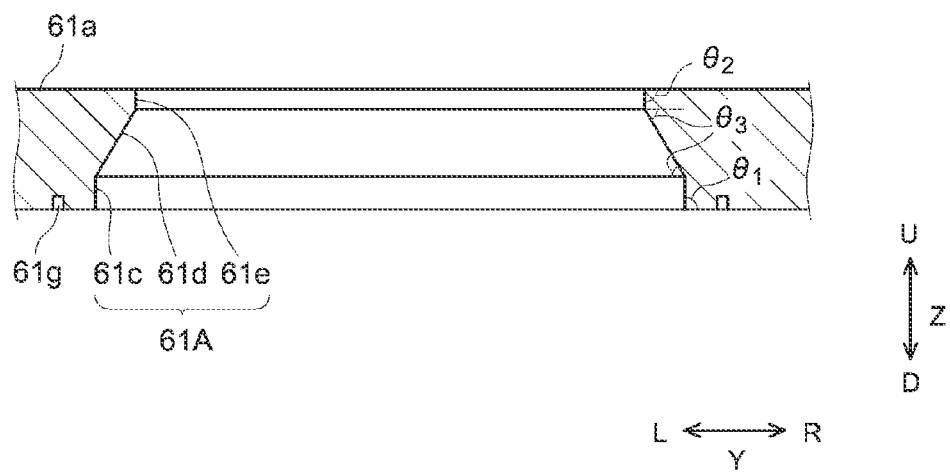
FIG. 13 is a partially enlarged cross sectional view that schematically shows a configuration of the negative electrode first electrical collector part (for more details, negative electrode first area) in accordance with one embodiment.

Firstly, at Step S1 (preparing step), the negative electrode first electrical collector part 61 including the negative electrode first area 61a as shown in FIG. 13 is prepared. The negative electrode first area 61a includes the penetration hole 61A including the taper part 61d that has the inclination for making the inner diameter become gradually larger along the insertion direction (in other words, down direction D in FIG. 13). In addition, the negative electrode first electrical collector part 61 in accordance with the present embodiment furthermore includes the penetration hole first area 61c and the penetration hole second area 61e. Then, the penetration hole first area 61c and the penetration hole second area 61e are formed to be perpendicular to the surface of the negative electrode first area 61a configuring the periphery of the penetration hole 61A. In other words, when the angle defined by the surface of the negative electrode first area 61a and the penetration hole first area 61c is treated as a $\theta_1$ and the angle defined by the surface of the negative electrode first area 61a and the penetration hole second area 61e is treated as $\theta_2$, the penetration hole first area 61c and the penetration hole second area 61e are formed to make the $\theta_1$ and the $\theta_2$ be 90° (see FIG. 13). The penetration hole 61A includes the penetration hole first area 61c, and thus it is possible at Step S4 described later (outer circumference smoothing part forming step) to suitably reduce the gap (see the gap S of FIG. 14C) capable of appearing between the outer circumference smoothing part 40a and the edge part of the penetration hole 61A. It is possible by this to join the outer circumferential flat part 40a and the edge part of the penetration hole 61A with the high accuracy, further it is possible by including the penetration hole second area 62e to perform the caulking with the high reliability at Step S3 described later (caulking step), and therefore it is possible to obtain the battery 100 in which the reliability of the vicinity of the caulked part 40b of the negative electrode terminal 40 is suitably enhanced.

In addition, although the inclination included by the taper part 61d (in other words, $\theta_3$ of FIG. 13) is not particularly restricted if the effects of the technique herein disclosed is implemented, it can be approximately within a range about 50° to 70° (for example, about 55° to 65°).

Here, in the case where the thickness u of the negative electrode first area 61a in the down direction D (see FIG. 14A) is about 1 mm, the thickness v of the penetration hole first area 61c in the Z direction can be approximately equal to or more than 0.1 mm, although being not particularly restricted if the effects of the technique herein disclosed is implemented. In addition, at Step S4 described later, from a perspective of effectively reducing the gap capable of appearing between the outer circumference smoothing part 40a and the edge part of the penetration hole 61A, the above described thickness v can be preferably equal to or more than 0.2 mm. Although the upper limit of the above described thickness v is not particularly restricted if the effects of the technique herein disclosed is implemented, it can be approximately equal to or less than 0.4 mm. Regarding the penetration hole second area 61e, similar things can be done. In addition, although the length of taper part 61d is not particularly restricted if the effects of the technique herein disclosed is implemented, it can be approximately about 0.3 mm to 0.7 mm. However, they do not restrict the present disclosure.

Next, at Step S2 (inserting step), the negative electrode terminal (for more details, the negative electrode terminal 40' before the caulking process) is inserted into the penetration hole 61A included by the negative electrode first electrical collector part 61. In particular, the negative electrode terminal 40' before the caulking process is inserted into the penetration hole 90h of the gasket 90, the terminal taking out hole 19 of the opening-seal plate 14, the penetration hole 80h of the negative electrode insulation member 80, and then the penetration hole 61A of the negative electrode first electrical collector part 61 in this order from the upward of the opening-seal plate 14, so as to be made to protrude to the downward of the opening-seal plate 14 (see FIG. 8, and FIG. 14A).

Figure 14A:
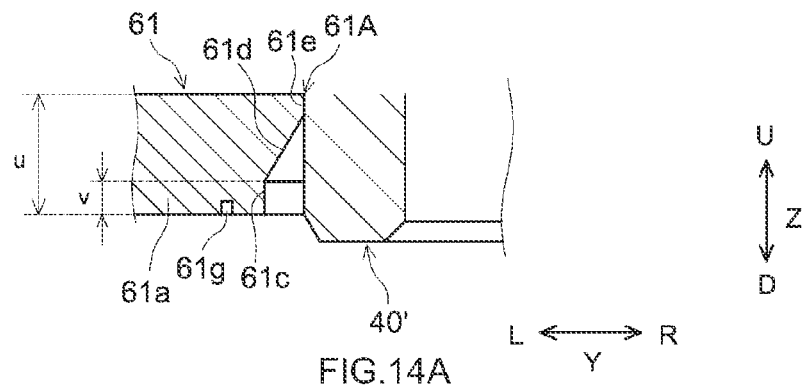
FIGS. 14A to D are explanation views for explaining the manufacturing method of the battery in accordance with one embodiment.
Figure 14B:
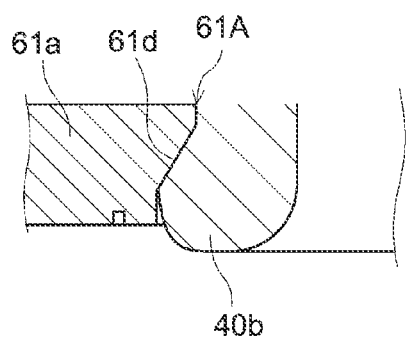

Next, at Step S3 (caulking step), the negative electrode terminal 40' inserted at the above described Step S2 is caulked on the taper part 61*d* included by the penetration hole 61A so as to form the caulked part 40*b* (see FIG. 14B). In particular, while each part is pinched such that the compression force is added in the vertical direction Z, the negative electrode terminal 40 is hit by a caulking punch, and therefore the axis diameter of the negative electrode terminal 40 is expanded to contact with the taper parts 61*e*, 61*d* so as to implement the caulking fixation on each part. The negative electrode terminal 40 is fixed in a state of contacting with the penetration hole second area 61*e*, and thus it is possible by the load in the vertically direction (in other words, vertical direction Z) due to the caulking punch to suitably inhibit the negative electrode first electrical collector part 61 (for more details, negative electrode first area 61*a*) from being deformed in the above described vertically direction. By this, it is possible to suitably enhance the reliability of caulking.

Figure 14C:
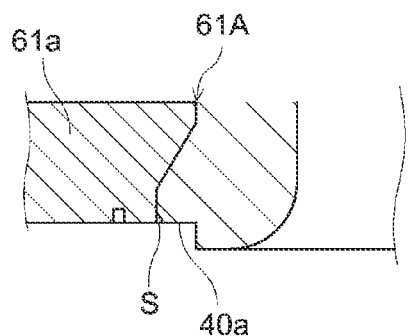

At Step S4 (outer circumference smoothing part forming step), an outer circumference smoothing part 40*a* including a step difference is formed on the outer circumferential edge of the caulked part 40*b* being formed at the above described Step S3 (see FIG. 14C). Here, as one example of the method for forming the outer circumference smoothing part 40*a*, it is possible to perform the ring punch. By performing the ring punch, it is possible to form the outer circumference smoothing part 40*a* whose shape in a plane view is a ring shape (see FIG. 9A and FIG. 9B). In addition, as shown in FIG. 14C, at this step, the gap S can appear between the outer circumference smoothing part 40*a* and the penetration hole 61A. Here, although the size of the above described gap S in the long side direction Y is not particularly restricted if the effects of the technique herein disclosed is implemented, it is approximately equal to or less than 0.5 mm, preferably equal to or less than 0.2 mm, or furthermore preferably 0 mm. It is possible by reducing the size of the above described gap S to be able to perform joining at the high accuracy at Step S5 described later (joining step), which is preferable.

In addition, the negative electrode first area 61*a* in accordance with the present embodiment includes a recessed part 61*g* formed along the outer circumferential edge of the penetration hole 61A (see FIG. 13). The recessed part 61*g* can be formed, for example, by performing the laser etching, or the like on the surface of the negative electrode first area 61*a*. Due to the recessed part 61*g* as described above, it is possible to suitably reduce the heat capacity at the vicinity of the join part 61*f* (in other words, it is possible to implement joining with a small heat amount), and thus it is possible to suitably reduce the heat effect on the resin parts at the periphery of the join part 61*f*.

Figure 14D:
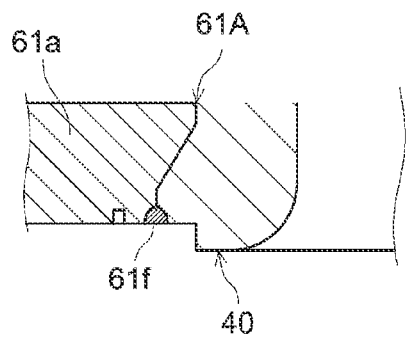

At Step S5 (joining step), the outer circumference smoothing part 40*a* formed at the above described Step S4 and the edge part of the penetration hole 61A are joined (see FIG. 14D). The join as described above can be performed, for example, by laser welding. In addition, the manufacturing method of the battery 100 in accordance with the present embodiment provides a portion whose one part is not joined (in other words, the join part 61*f* is formed to make the shape in a plane view be a not-ring shape) as shown in FIG. 9A and FIG. 9B. By this, for example, when the laser join is performed, it can facilitate confirming the laser track deviation. In addition, it is possible to suitably inhibit the join start part and the join end part from colliding with each other. In other words, it is possible suitably enhance the mechanical strength of the join part 61*f*. In addition, by making the ratio (s/r) of the length s of the join part 61*f* in the circumferential direction with respect to the length r of the whole circumference of the outer circumference smoothing part 40*a* be within the range described in <Battery 100>, it is possible to obtain the above described effect more suitably.

Here, although the size of the join part 61*f* in the vertical direction Z is not particularly restricted if the effects of the technique herein disclosed is implemented, for example, with the thickness v of the penetration hole first area 61*c* in the vertical direction Z being about 0.2 mm it can be preferably about 0.3 mm to 0.6 mm (for example, about 0.4 mm to 0.5 mm). However, they do not restrict the present disclosure.

By Steps S1 to S5 as described above, the gasket 90, the opening-seal plate 14, the negative electrode insulation member 80, and the negative electrode first electrical collector part 61 are integrally fixed to the opening-seal plate 14 so as to seal the terminal taking out hole 19.

Fixing the positive electrode terminal 30, the positive electrode first electrical collector part 51, and the positive electrode insulation member 70 can be performed similarly to the above described negative electrode side. In other words, it is possible to fix through the above described Steps S1 to S5.

Next, to the outside surface of the opening-seal plate 14, the positive electrode outside conductive member 32 and the negative electrode outside conductive member 42 are attached through the outside insulation member 92. Additionally, the material of the outside insulation member 92 might be similar to the positive electrode insulation member 70. In addition, the timing of attaching the positive electrode outside conductive member 32 and the negative electrode outside conductive member 42 might be after the inserting step (for example, after the liquid injection hole 15 is sealed).

At the second attaching step, the first combined member manufactured at the first attaching step is used to manufacture a second combined member as shown in FIG. 5. In other words, the electrode body group 20 integrated with the opening-seal plate 14 is manufactured. In particular, at first, as shown in FIG. 6, three electrode bodies 20*a*, each attached with the positive electrode second electrical collector part 52 and the negative electrode second electrical collector part 62, are prepared to be as the electrode bodies 20*a*, 20*b*, 20*c*, and are aligned in the short side direction X. At that time, the electrode bodies 20*a*, 20*b*, 20*c* might be arranged in parallel such that, in any of the electrode bodies, the positive electrode second electrical collector part 52 is arranged at one side (left side in FIG. 5) in the long side direction Y and the negative electrode second electrical collector part 62 is arranged at the other side (right side in FIG. 5) in the long side direction Y.

Next, in a state that the plurality of positive electrode tabs 22*t* are bent as shown in FIG. 4, the positive electrode first electrical collector part 51 (for more details, positive electrode second area 51*b*) fixed to the opening-seal plate 14 and the positive electrode second electrical collector part 52 (for more details, electrical collector plate connecting part 52*a*) of the electrode body 20*a*. 20*b*, 20*c* are respectively joined. In addition, in a state that the plurality of negative electrode tabs 24*t* are bent, the negative electrode first electrical collector part 61 fixed to the opening-seal plate 14 and the negative electrode second electrical collector part 62 of the electrode body 20*a*. 20*b*, 20*c* are respectively joined. As the joining method, it is possible to use welding, for example, ultrasonic welding, resistance welding, laser welding, or the like. Particularly, it is preferable to use welding by irradiation of high energy ray, such as laser. By performing the welding process as described above, join parts are formed respectively on the recessed part 52d of the positive electrode second electrical collector part 52 and the recessed part 62d of the negative electrode second electrical collector part 62.

Figure 15:
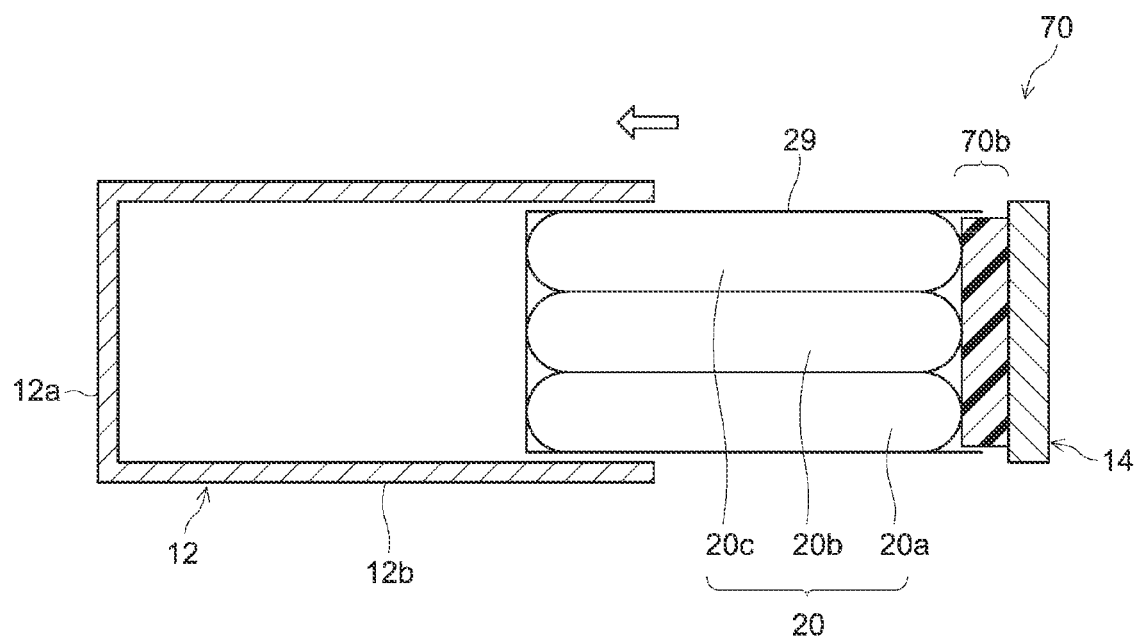
FIG. 15 is a cross sectional view that is schematically shown for explaining an inserting step of the battery in accordance with one embodiment.

At the inserting step, the second combined member manufactured at the second attaching step is accommodated in the inside space of the outer package 12. FIG. 15 is a schematic cross sectional view that explains the inserting step. In particular, at first, a resin sheet having an insulating property and being made of a resin material, for example, polyethylene (PE), or the like, is bent to be a bag-shape or a box-shape, so as to prepare the electrode body holder 29. Next, the electrode body group 20 is accommodated in the electrode body holder 29. Then, the electrode body group 20 covered by the electrode body holder 29 is inserted into the outer package 12. In the case where the weight of the electrode body group 20 is larger, the weight being approximately equal to or more than 1 kg, for example, equal to or more than 1.5 kg, or further 2 to 3 kg, it is preferable that arrangement is performed to make the long side wall 12b of the outer package 12 cross the gravity direction (arranging the outer package 12 in sideways) and then the electrode body group 20 is inserted into the outer package 12, as shown in FIG. 12.

At the sealing step, the opening-seal plate 14 is joined to the edge part of the opening 12h of the outer package 12 so as to seal the opening 12h. The sealing step can be performed simultaneously with the inserting step or after the inserting step. At the sealing step, it is preferable that the outer package 12 and the opening-seal plate 14 are welded and joined. Welding and joining the outer package 12 and the opening-seal plate 14 can be performed, for example, by laser welding or the like. Then, the electrolyte is injected from the liquid injection hole 15 and then the liquid injection hole 15 is covered by the sealing member 16, so as to seal the battery 100. As described above, it is possible to manufacture the battery 100.

Although the battery 100 can be used for various purposes, it is possible to suitably use the battery for a purpose in which external force, such as vibration and impact, is added at the use time, for example, as the power source (power supply for drive) for a motor mounted on a movable body (vehicle of, typically, car, truck, or the like). Although the type of the vehicle is not particularly restricted, it is possible to consider, for example, plug-in hybrid vehicle (PHEV), hybrid vehicle (HEV), electric vehicle (BEV), or the like. It is possible to suitably use the battery 100 as a battery pack which is made by arranging a plurality of batteries 100 in a predetermined sequence direction and then by making a restrict mechanism add a load from the sequence direction.

Above, some embodiments of the present disclosure are explained, but the above described embodiments are merely examples. The present disclosure can be implemented in various other forms. The present disclosure can be executed based on the contents disclosed in the present specification, and the technical common sense in the present field. The technique recited in the appended claims includes variously deformed or changed versions of the embodiments that have been illustrated above. For example, one part of the above described embodiment can be replaced with another deformed aspect, and furthermore another deformed aspect can be added to the above described embodiment. In addition, unless a technical feature is explained to be essential, this technical feature can be appropriately deleted.

In the above described embodiment, it explains about an aspect in which each of the positive electrode terminal 30 and the negative electrode terminal 40 includes the structure of the caulked part vicinity of the herein disclosed terminal, which does not restrict the present disclosure. For example, only one among the positive electrode terminal and the negative electrode terminal might include the structure of the caulked part vicinity of the herein disclosed terminal.

Figure 16:
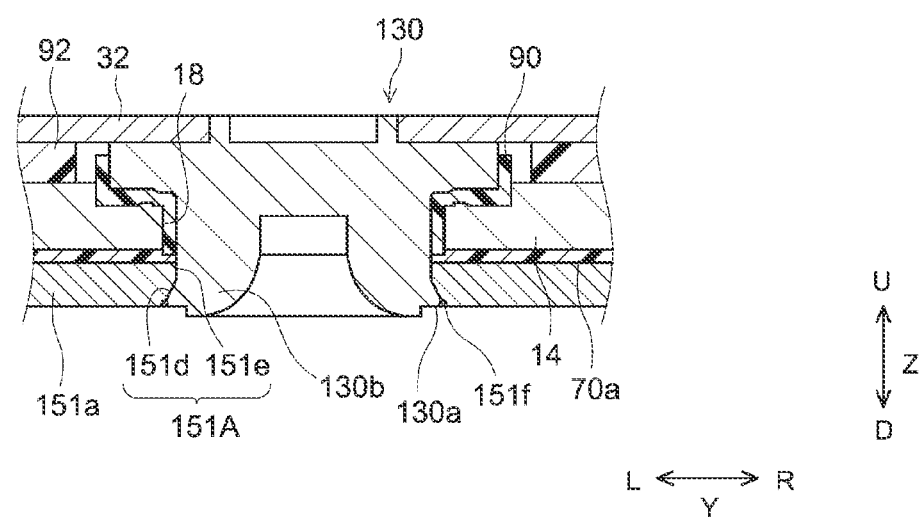
FIG. 16 is a partially enlarged cross sectional view that schematically shows the vicinity of the positive electrode terminal in accordance with another embodiment.

In the above described embodiment, the penetration hole of the positive electrode first area 51a and the penetration hole of the negative electrode first area 61a have similar structures to each other, which does not restrict the present disclosure. For example, it is possible regarding the negative electrode electrical collector part to use a negative electrode electrical collector part including the negative electrode first area provided with the penetration hole as the above described embodiment and possible regarding the positive electrode electrical collector part to use a positive electrode electrical collector part including the first positive electrode area 151a provided with the penetration hole 151A as shown in FIG. 16. Particularly, as shown in FIG. 16, the positive electrode first area 151a includes the penetration hole 151A provided with the penetration hole second area 151e and the taper part 151d, the positive electrode terminal 130 is caulked at the taper part 151d, and the outer circumference smoothing part 130a is formed at the outer circumferential edge of the caulked part 130b. Then, the outer circumference smoothing part 130a and the edge part of the penetration hole 151A are joined so as to form the join part 151f.

Figure 17A:
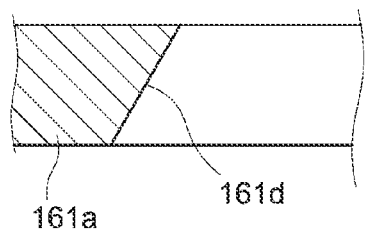
FIG. 17A is a partially enlarged cross sectional view for explaining a configuration of the negative electrode first electrical collector part (for more details, negative electrode first area) in accordance with another embodiment.
Figure 17B:
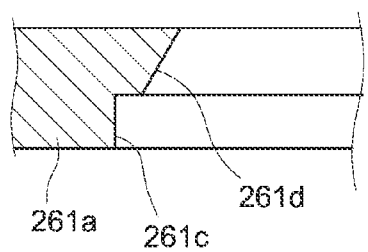
FIG. 17B is a partially enlarged cross sectional view for explaining a configuration of the negative electrode first electrical collector part (for more details, negative electrode first area) in accordance with another embodiment.
Figure 17C:
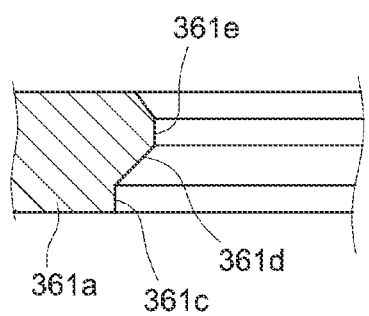
FIG. 17C is a partially enlarged cross sectional view for explaining a configuration of the negative electrode first electrical collector part (for more details, negative electrode first area) in accordance with another embodiment.
Figure 17D:
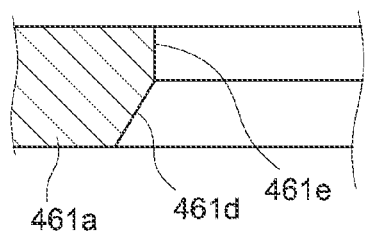
FIG. 17D is a partially enlarged cross sectional view for explaining a configuration of the negative electrode first electrical collector part (for more details, negative electrode first area) in accordance with another embodiment.

In the above described embodiment, it explains about an aspect in which the negative electrode first area 61a includes the penetration hole first area 61c, the taper part 61d, and the penetration hole second area 61e, which does not restrict the present disclosure. For example, as shown in FIG. 17A, the aspect may have the negative electrode first area 161a including only the taper part 161d. In addition, as shown in FIG. 17B, the aspect may have the negative electrode first area 261a including the penetration hole first area 261c, the taper part 261d, and other areas. Then, as shown in FIG. 17C, the aspect may have the negative electrode first area 361a including the penetration hole first area 361c, the taper part 361d, the penetration hole second area 361e, and other areas. As shown in FIG. 17D, the aspect may have the negative electrode first area 461a including only the penetration hole second area 461e and the taper part 461d. Alternatively, the aspect may have the negative electrode first area including only the penetration hole first area and the taper part. The positive electrode side can be also explained similarly. Additionally, it is possible to adopt various aspects other than the above described aspects.

In the above described embodiment, the thicknesses of the penetration hole first area 61c and penetration hole second area 61e in the Z direction are similar to each other, which does not restrict the present disclosure. These thicknesses might be different from each other. The positive electrode side can be also implemented similarly.

In the above described embodiment, it explains about an aspect in which the penetration hole first area 61c, the taper part 61d, and the penetration hole second area 61e are respectively connected by points, which does not restrict the present disclosure. For example, they might be connected by not the points but the Rs. The positive electrode side can be also implemented similarly.

In the above described embodiment, it explains about an aspect in which the outer circumference smoothing part 40*a* and the surface of the negative electrode first area 61*a* are formed so as to exist on the same flat surface, which does not restrict the present disclosure. For example, the outer circumference smoothing part 40*a* and the surface of the negative electrode first area 61*a* might be formed to exist on not the same flat surface if the effects of the technique herein disclosed is implemented. The positive electrode side can be also implemented similarly.

In the above described embodiment, the shape of the outer circumference smoothing part 40*a* in a plane view is a ring shape, which does not restrict the present disclosure. For example, the outer circumference smoothing part can be in a state that one part of it is lacked (in other words, approximately ring-shape or not-ring shape). Additionally, in the above described embodiment, the shapes of the join part 61*f* and the recessed part 61*g* in plane views are not-ring shapes, but might be approximately ring shapes. Then, in the above described embodiment, as shown in FIG. 9A, the join part 61*f* and the recessed part 61*g* are formed to be symmetry with respect to the center line T at the outermost circumference of the outer circumference smoothing part 40*a*, which does not restrict the present disclosure, and the join part and the recessed part might be formed to be asymmetry with respect to the center line T. The positive electrode side can be also implemented similarly.

In the above described embodiment, the recessed part 61*g* is formed along the penetration hole 61A, which does not restrict the present disclosure, and an aspect in which no recessed part is formed can be adopted. The positive electrode side can be also implemented similarly.

In the above described embodiment, it explains about the case where the "conductive member" is the electrical collector part (in other words, the positive electrode electrical collector part 51, and the negative electrode electrical collector part 61), which does not restrict the present disclosure. The herein disclosed technique can be suitably applied even in the case where the "conductive member" is the outside conductive member (in other words, the positive electrode outside conductive member 32, and the negative electrode outside conductive member 42).

What is claimed is:

1. A battery comprising:
an electrode body that comprises a positive electrode and a negative electrode;
a battery case that comprises an outer package having an opening for accommodating the electrode body and comprises an opening-seal plate for sealing the opening;
a terminal that is electrically connected to the positive electrode or the negative electrode and that penetrates a terminal taking out hole of the opening-seal plate; and
a conductive member that is connected to the terminal,
wherein the conductive member comprises a penetration hole into which the terminal is inserted,
the penetration hole comprises a taper part having an inclination for making an inner diameter become gradually larger along the insertion direction,
here, the terminal is caulked at the taper part in a state of being arranged in the penetration hole,
an outer circumference smoothing part having a step difference is formed at an outer circumferential edge of the caulked part, and
a join part exists at which the outer circumference smoothing part and an edge part of the penetration hole are joined.

2. The battery according to claim 1,
wherein a shape of the outer circumference smoothing part in a plane view is approximately a ring shape.

3. The battery according to claim 1,
wherein the penetration hole comprises a penetration hole first area at a position away from the opening-seal plate more than the taper part, and
the penetration hole first area is formed to be approximately perpendicular to a surface of the conductive member configuring a periphery of the penetration hole.

4. The battery according to claim 3,
wherein a thickness of the penetration hole first area in an insertion direction of the terminal is equal to or more than 0.2 mm.

5. The battery according to claim 1,
wherein the penetration hole comprises a penetration hole second area at a position closer to the opening-seal plate than the taper part, and
the penetration hole second area is formed to be approximately perpendicular to a surface of the conductive member configuring a periphery of the penetration hole.

6. The battery according to claim 1,
wherein a ratio of an outermost diameter of the caulked part with respect to an innermost diameter at the penetration hole is within a range from 1.05 to 1.15.

7. The battery according to claim 1,
wherein the outer circumference smoothing part comprises an area in which the join part is not formed.

8. The battery according to claim 1,
wherein a shape of the outer circumference smoothing part in a plane view is approximately a ring shape, and
a shape of the join part in a plane view is a not-ring shape.

9. The battery according to claim 1,
wherein a recessed part is formed on the conductive member along an outer circumferential edge of the penetration hole.

10. A manufacturing method for a battery, the battery comprising:
an electrode body that comprises a positive electrode and a negative electrode;
a battery case that comprises an outer package having an opening for accommodating the electrode body and comprises an opening-seal plate for sealing the opening;
a terminal that is electrically connected to the positive electrode or the negative electrode and that is inserted into a terminal taking out hole of the opening-seal plate; and
a conductive member that comprises a penetration hole into which the terminal is inserted,
the manufacturing method comprising:
a preparing step for preparing the conductive member that comprises a penetration hole having a taper part which comprises an inclination for making an inner diameter become gradually larger along the insertion direction;
an inserting step for inserting the terminal into the penetration hole;
a caulking step for caulking the terminal at the taper part of the penetration hole so as to form a caulked part on the terminal;
an outer circumference smoothing part forming step for forming a step difference at an outer circumferential edge of the caulked part, so as to form an outer circumference smoothing part; and a joining step for joining the outer circumference smoothing part and an edge part of the penetration hole.

11. The manufacturing method for the battery according to claim 10,
wherein the outer circumference smoothing part is formed at the outer circumference smoothing part forming step to make a shape in a plane view be approximately a ring shape.

12. The manufacturing method for the battery according to claim 10,
wherein the penetration hole comprises a penetration hole first area at a position away from the opening-seal plate more than the taper part, and
the penetration hole first area is formed to be approximately perpendicular to a surface of the conductive member configuring a periphery of the penetration hole.

13. The manufacturing method for the battery according to claim 12,
wherein a thickness of the penetration hole first area in an insertion direction of the terminal is equal to or more than 0.2 mm.

14. The manufacturing method for the battery according to claim 10,
wherein the penetration hole comprises a penetration hole second area at a position closer to the opening-seal plate than the taper part, and
the penetration hole second area is formed to be approximately perpendicular to a surface of the conductive member configuring a periphery of the penetration hole.

15. The manufacturing method for the battery according to claim 10,
wherein the outer circumference smoothing part is formed at the outer circumference smoothing part forming step to make a ratio of an outermost diameter of the caulked part with respect to an innermost diameter at the penetration hole be within a range from 1.05 to 1.15.

16. The manufacturing method for the battery according to claim 10,
wherein the outer circumference smoothing part with an area in which the join part is not formed is provided at the joining step.

17. The manufacturing method for the battery according to claim 10,
wherein the outer circumference smoothing part is formed at the outer circumference smoothing part forming step to make a shape in a plane view be approximately a ring shape, and
the join part is formed at the joining step to make a shape in a plane view be a not-ring shape.

18. The manufacturing method for the battery according to claim 10,
wherein a recessed part is formed on the conductive member along an outer circumferential edge of the penetration hole.

* * * * *